(12) United States Patent
Noell

(10) Patent No.: US 9,734,646 B1
(45) Date of Patent: Aug. 15, 2017

(54) SYSTEM, METHOD, AND APPARATUS FOR ACCESSING REAL ESTATE PROPERTY

(71) Applicant: John P. Noell, Largo, FL (US)

(72) Inventor: John P. Noell, Largo, FL (US)

(*) Notice: Subject to any disclaimer, the term of this patent is extended or adjusted under 35 U.S.C. 154(b) by 0 days.

(21) Appl. No.: 15/142,575

(22) Filed: Apr. 29, 2016

(51) Int. Cl.
| | |
|---|---|
| *G07C 9/00* | (2006.01) |
| *G06Q 40/02* | (2012.01) |
| *H04L 29/08* | (2006.01) |
| *G06Q 50/06* | (2012.01) |
| *G06Q 50/16* | (2012.01) |

(52) U.S. Cl.
CPC ........ *G07C 9/00111* (2013.01); *G06Q 40/025* (2013.01); *G07C 9/00896* (2013.01); *H04L 67/18* (2013.01); *G06Q 50/163* (2013.01)

(58) Field of Classification Search
CPC ............... G06Q 40/025; G06Q 50/163; G07C 9/00111; G07C 9/00896; H04L 67/18
USPC .................................................. 340/5.61, 5.6
See application file for complete search history.

(56) References Cited

U.S. PATENT DOCUMENTS

| | | | |
|---|---|---|---|
| 4,727,368 A | 2/1988 | Larson | |
| 4,766,746 A | 8/1988 | Henderson | |
| 4,831,851 A | 5/1989 | Larson | |
| 4,887,292 A | 12/1989 | Barrett | |
| 4,896,246 A | 1/1990 | Henderson | |
| 4,914,732 A | 4/1990 | Henderson | |
| 4,916,443 A | 4/1990 | Barrett | |
| 4,929,880 A | 5/1990 | Henderson | |
| 4,947,163 A | 8/1990 | Henderson | |
| 4,988,987 A | 1/1991 | Barrett | |
| 5,046,084 A | 9/1991 | Barrett | |
| 5,245,652 A | 9/1993 | Larson | |
| 5,267,460 A | 12/1993 | Burleigh | |
| 5,280,518 A | 1/1994 | Danler | |
| 5,475,375 A | 12/1995 | Barrett | |
| 5,550,529 A | 8/1996 | Burge | |
| 5,602,536 A | 2/1997 | Henderson | |
| 5,654,696 A | 8/1997 | Barrett | |
| 5,705,991 A | 1/1998 | Kniffin | |
| 5,768,921 A | 6/1998 | Hill | |
| 5,794,465 A | 8/1998 | Hill | |
| 6,072,402 A | 6/2000 | Kniffin | |
| 6,472,973 B1 | 10/2002 | Harold | |
| 8,145,352 B2 | 3/2012 | Woodard | |
| 8,335,488 B2 | 12/2012 | Despain | |
| 8,437,740 B2 | 5/2013 | Despain | |

(Continued)

*Primary Examiner* — Quan-Zhen Wang
*Assistant Examiner* — Stephen Burgdorf
(74) *Attorney, Agent, or Firm* — Larson & Larson, P.A.; Frank Liebenow

(57) ABSTRACT

A system for premise access includes a device for accessing the system by a prospective buyer that has a location determining subsystem. An application running on the device for accessing the system downloads a set of currently available premise listings. Upon arrival near one of the premises as determined by comparing a location of the device to each of the currently available premise listings, if the prospective buyer is authorized to enter the one of the premises and if the prospective buyer indicates a desire to enter the one of the premises, the application running on the device for accessing provides an access code for entry into the one of the premises (e.g. opens a lock or lockbox by radio frequency transmission, opens a lock or lockbox by infra-red transmission, displays a combination, etc.).

17 Claims, 27 Drawing Sheets

(56) References Cited

U.S. PATENT DOCUMENTS

| | | |
|---|---|---|
| 8,451,088 B2 | 5/2013 | Fisher |
| 8,754,744 B2 | 6/2014 | Woodard |
| 8,912,884 B2 | 12/2014 | Fisher |
| 2004/0252018 A1 | 12/2004 | Shuster |
| 2005/0168320 A1 | 8/2005 | Henderson |
| 2005/0171822 A1* | 8/2005 | Cagan ............... G06Q 40/06 705/36 R |
| 2006/0042331 A1 | 3/2006 | Benda |
| 2007/0290798 A1 | 12/2007 | Larson |
| 2007/0290799 A1 | 12/2007 | Harkins |
| 2008/0252415 A1 | 10/2008 | Larson |
| 2009/0038195 A1 | 2/2009 | Riker |
| 2009/0095036 A1 | 4/2009 | Ng |
| 2009/0153291 A1 | 6/2009 | Larson |
| 2009/0167526 A1 | 7/2009 | Graves |
| 2011/0053557 A1* | 3/2011 | Despain ............... A47G 29/10 455/410 |
| 2011/0252839 A1 | 10/2011 | Stevens |
| 2012/0119877 A1 | 5/2012 | Ng |
| 2012/0198895 A1 | 8/2012 | De Maria |
| 2012/0246024 A1* | 9/2012 | Thomas ............... G06Q 50/16 705/26.41 |
| 2013/0187756 A1 | 7/2013 | Fisher |
| 2014/0125454 A1 | 5/2014 | De Maria |
| 2014/0130722 A1 | 5/2014 | Dudgeon |
| 2015/0022315 A1 | 1/2015 | Ng |
| 2015/0091696 A1 | 4/2015 | Fisher |
| 2015/0170233 A1* | 6/2015 | Lisitsa ............... H01L 23/427 705/26.1 |
| 2015/0330105 A1 | 11/2015 | Ng |
| 2015/0332417 A1* | 11/2015 | Haynes ............... G06Q 10/047 705/313 |
| 2015/0356695 A1* | 12/2015 | Schmidt-Lackner G06Q 50/163 705/30 |
| 2015/0371470 A1 | 12/2015 | Brown |
| 2017/0031950 A1* | 2/2017 | Lete ............... G06F 17/30241 |

\* cited by examiner

380

Name: _____
SS#: _____
Current Address: _____

Occupation: _____
Employer: _____
Salary: _____ per: _____ (W/M/Y)
Marital Status: _____

Loan Paperwork

*FIG. 4*

SYSTEM, METHOD, AND APPARATUS FOR ACCESSING REAL ESTATE PROPERTY

FIELD

This invention relates to real estate services and more particularly to a system for providing access to real estate properties by prospective buyers.

BACKGROUND

Currently, there are many ways of providing access to properties that are for sale or rent. Access is provided so that prospective buyers/renters and some contractors are able to inspect the property to understand if the property meets their needs/requirements, especially when the buyers/renters will make such property their home.

Real estate agents typically require access to properties so that they can show their clients what is being offered. In many scenarios, the real estate agent is needed as many properties being shown are occupied requiring scheduling and a trusted/bonded person to escort the prospective buyers to protect the property and contents of the property, although some properties are vacant and there are no contents that need protection.

In general, most properties are typically protected by a locking system to prevent burglary, vandalism, and squatting (living in a property that is not owned by the person living in such). Many locking systems involve a door that has a lock, either a key-entry lock or a newer, electronic lock.

A long time ago, a listing real estate agent had access to all the properties that he or she listed by a large supply of keys, one key for each property. When a client wanted to see a property, the agent finds the key for that property and goes to the property with the client. This method may work for a very small town, but as larger towns and cities grew, it became difficult to manage so many keys.

To reduce the need for a huge amount of keys while providing access to properties by agents and buyers, lockboxes were made. Initially, lockboxes were mechanical having a padlock-like arm that secured the lockbox to the property, usually around a door handle, and a cavity for holding a property key that could only be accessed by a master key or a combination known only to real estate agents that were approved to access the property. Upon arriving at the property, the agent would provide the access key that would open the cavity and expose the property key that the agent then uses to open the door to the property.

As the lockboxes evolved, electronic versions were introduced that used wireless key fobs to access the property key, then as smart-phones became more ubiquitous, the lockboxes were designed to provide access when an application running on the smart-phone sent certain cryptographic signals to the lockbox, for example, using Bluetooth technology. Still, the real estate agents are required since there is still a need to make sure nothing is removed from the property and nothing is damaged.

In some real estate scenarios, the property is vacant and, hence, it is not as much of a concern that a real estate agent be present while the prospective buyer visits the property. For example, a qualified buyer is able to walk through a vacant condominium without the need for an agent to follow them through every room. There are many situations in which there are many such properties in a relatively close geographical area, such as when a tract of houses are built or a new condominium is built. There are often tens or hundreds of homes or apartments that lay vacant for viewing by prospective buyers. Today, one or more agents is/are situated at such locations during business hours to escort prospective buyers through available properties.

What is needed is a system that will provide access to properties by individual buyers that are prequalified for access.

SUMMARY

A system for providing access to premises includes providing pre-approval for access to a subset of premises based upon requisite criteria. Once approval for access is provided, a recipient of such is free to access the subset of premises until approval ends or is revoked. Approval includes, for example, having been approved for a loan amount that matches the subset of premises. For example, if one is pre-approved for a loan amount of between two values, then premises that are listed for an amount that is commensurate with such a loan amount are accessible by the prospective buyer with the approval. Access is provided through an electronic or manual home entry system such as a combination lock or electronic lock. For example, a listing price is commensurate with a pre-approved loan amount if the listing price does not exceed the loan amount by, for example, a certain percentage (e.g., 10%) or a certain amount (e.g., $10,000), etc.

In one embodiment, a system for premise access includes a device for accessing the system by a prospective buyer that has a location determining subsystem (e.g., GPS). The system has a server with a set of currently available premise listings. An application running on the device for accessing the system downloads the set of currently available premise listings and stores the set of currently available premise listings at the device for accessing. Upon arrival near one of the premises as determined by comparing a location of the device to each of the currently available premise listings, if the prospective buyer is authorized to enter the one of the premises and if the prospective buyer indicates a desire to enter the one of the premises, the application running on the device for accessing provides an access code for entry into the one of the premises (e.g. opens a lock or lockbox by radio frequency transmission, opens a lock or lockbox by infra-red transmission, displays a combination, etc.).

In another embodiment, a method of providing access to a premise by a prospective buyer includes providing a set of listings of premises available and qualifying the prospective buyer for a subset of the listings of premises available. An application running on a portable device determines when the portable device is near one of the premises in the subset of the listings and upon arrival near the one of the premises in the subset of listings, the application running on a portable device provides an entry function on the portable device. Upon selection of the an entry function by the prospective buyer, the application running on a portable device providing an entry key (e.g. opens a lock or lockbox by radio frequency transmission, opens a lock or lockbox by infra-red transmission, displays a combination, etc.).

In another embodiment, program instructions tangibly embodied in a non-transitory storage medium comprising at least one instruction running on a portable device for providing access to a premise by a prospective buyer The at least one instruction includes computer readable instructions running on a portable device for retrieving from a server a set of listings of premises that are approved for access by the prospective buyer. The computer readable instruction running on the portable device determine when the portable device is within range of one of the premises by comparing a location of the portable device (e.g., GPS location) with a location of each of the premises that are approved for access by the prospective buyer. Upon determining that the portable device is within range of the one of the premises, the computer readable instructions running on the portable device provide an access function on a display of the portable device and responsive to invoking the access function by the prospective buyer, the computer readable instructions running on the portable device initiate access of the one of the premises (e.g. open a lock or lockbox by radio frequency transmission, open a lock or lockbox by infra-red transmission, display a combination, etc.).

BRIEF DESCRIPTION OF THE DRAWINGS

The invention can be best understood by those having ordinary skill in the art by reference to the following detailed description when considered in conjunction with the accompanying drawings in which:

FIG. 4 illustrates a computer user interface of the property access system showing a terse loan application form.

DETAILED DESCRIPTION

Figure 1:
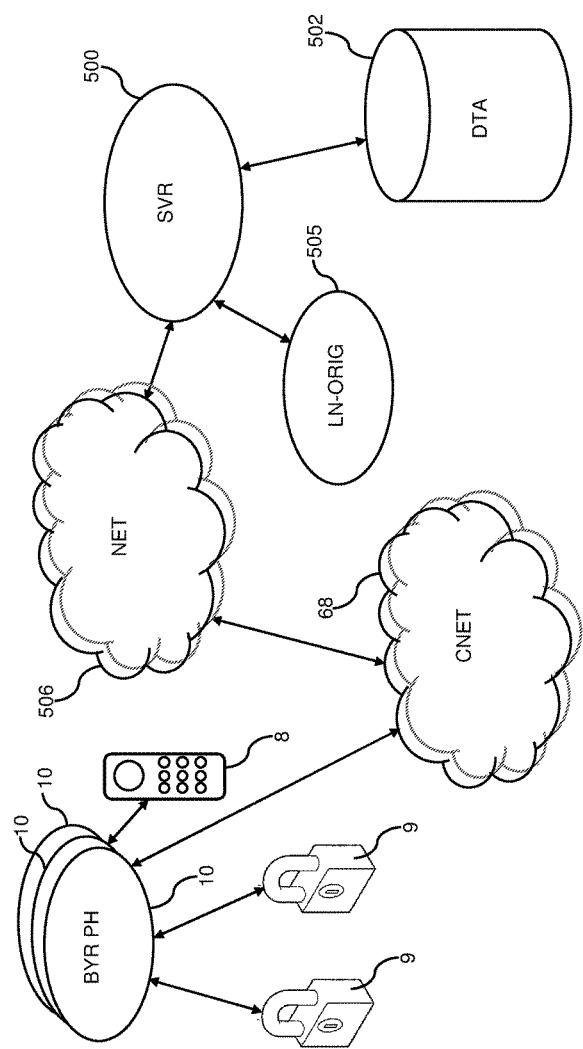
FIG. 1 illustrates a data connection diagram of the property access system.

Reference will now be made in detail to the presently preferred embodiments of the invention, examples of which are illustrated in the accompanying drawings. Throughout the following detailed description, the same reference numerals refer to the same elements in all figures.

In general, the property access system provides an automated way for prospective buyers to access properties at their own pace with or without a realtor present. The prospective buyer is pre-approved for accessing a range of properties and, using a cell phone application, the prospective buyer "unlocks" any approved premise for viewing the premise. The range of properties of which the prospective buyer is pre-approved is determined by a listing price of the properties being commensurate with a pre-approved loan amount that the buyer has obtained from a financial institution (e.g., bank).

Throughout this description, the term, "premise" refers to any property that is secured by a locking mechanism and is used interchangeably with "property." The term, "prospective buyer," refers to any person that is in the market for any such premise. The term, "realtor," refers to any person involved in offering and/or presenting a premise. The term, "seller" refers to any person or organization that has a stake in or claim to the premise/property (e.g., an owner). The term "GPS," refers to any form of location services capable of determining the location of, for example, the prospective buyer, including the well-known global positioning service that utilizes satellite triangulation, but also including device triangulation (e.g., using several cellular towers to triangulate a cell phone), etc. The term, "unlocks," refers to any known mechanism for gaining access to the premise for the purpose of viewing the premise, including unlocking an electronic lock, opening of a lockbox that has a key to the premise, or displaying a combination that can be used to open the premise door, etc.

In general, the term "near" with respect to how the software system is described refers to being within a certain distance from the access point of the premise, which typically means the access point is within sight of the prospective buyer so that, after initiating an access function on the prospective buyer's cell phone, the prospective buyer is in proximity to the access point (e.g. front door or location of the lockbox) and is able to open the door through the mechanisms provided. In general, as used, "near," typically refers to a few feet (e.g., 10 feet) of the access point (door) or location of the lockbox.

In general, the user of the system, method, and apparatus being described has a device that is processor-based, having input, output, communication capabilities, and location determination capabilities. In current technology, this would be a cell phone, portable digital assistant, tablet computer, electronic reader, etc., but there is no limitation on the actual device used, or for the type of user interface used, as technology progresses. For example, the described system, method, and apparatus is anticipated to be embodied in a different device in the future presenting all interfaces verbally or visually and accepting voice inputs, etc.

Referring to FIG. 1 illustrates a data connection diagram of the exemplary property access system. In this example, one or more devices such as cell phones 10 communicate through the cellular network 68 and/or through a wide area network 506 (e.g. the Internet) to a server computer 500.

The server computer 500 has access to data storage 502. Although one path between the cell phones 10 and the server 500 is shown going through the cellular network 68 and the wide area network 506 as shown, any known data path is anticipated. For example, the Wi-Fi transceiver 96 (see FIG. 2) of the cell phone 10 is used to communicate directly with the wide area network 506, which includes the Internet, and, consequently, with the server computer 500.

The server computer 500 transacts with software running on the cell phones 10 through the network(s) 68/506. The software (e.g., an application) present menus to/on the cell phones 10, provides data to the cell phones 10, and communicates information to the server such as the prospective buyer's location, etc.

The server computer 500 transacts with an application running on the cell phones 10 as needed, for example, when cell phone local data isn't sufficient for determining access to a particular premise. In some areas, cell phone access is sporadic and, being such, the application running on the cell phone downloads and caches premise information (e.g., pricing, types of access allowed, listing information, location coordinates) so that access to such properties is allowed to the proper prospective buyer based upon the location of the buyer.

In some embodiments, when the property access application initiates (starts) on the cell phone 10, the geographic area of the cell phone 10 as determined by reading the GPS subsystem 91 (see FIG. 2) of the cell phone 10 or by triangulation with several cellular towers.

In some embodiments, the location from the GPS subsystem 91 is forwarded to the server 500 periodically while the property access application is active so as to keep the server 500 informed of location changes and arrivals at different premises. In other embodiments, the location from the GPS subsystem 91 is forwarded to the server 500 when the prospective buyer indicates that they are at a premise of interest.

In FIG. 1, an exemplary loan origination system 505 is shown as one way to provide approval for a prospective buyer to access a subset of premises. The loan origination system 505 is, for example, a bank server that communicates loan approval information to the prospective buyer and/or to the server 500.

The property access system selectively provides access to a premise through an access system located at the premise (e.g., a door having a manual or automatic lock and, in some embodiments, a lockbox). In such, one way access is provided through a key that is a combination code (e.g. for use on a lockbox 9 that has a combination lock or a door entry device 8 that has a combination lock). Another way access is provided through a key that is a wireless transmission (e.g. for use with a lockbox 9 that has unlocks after reception and processing of the key or a door entry device 8 (lock) that unlocks after reception and processing of the key).

Figure 2:
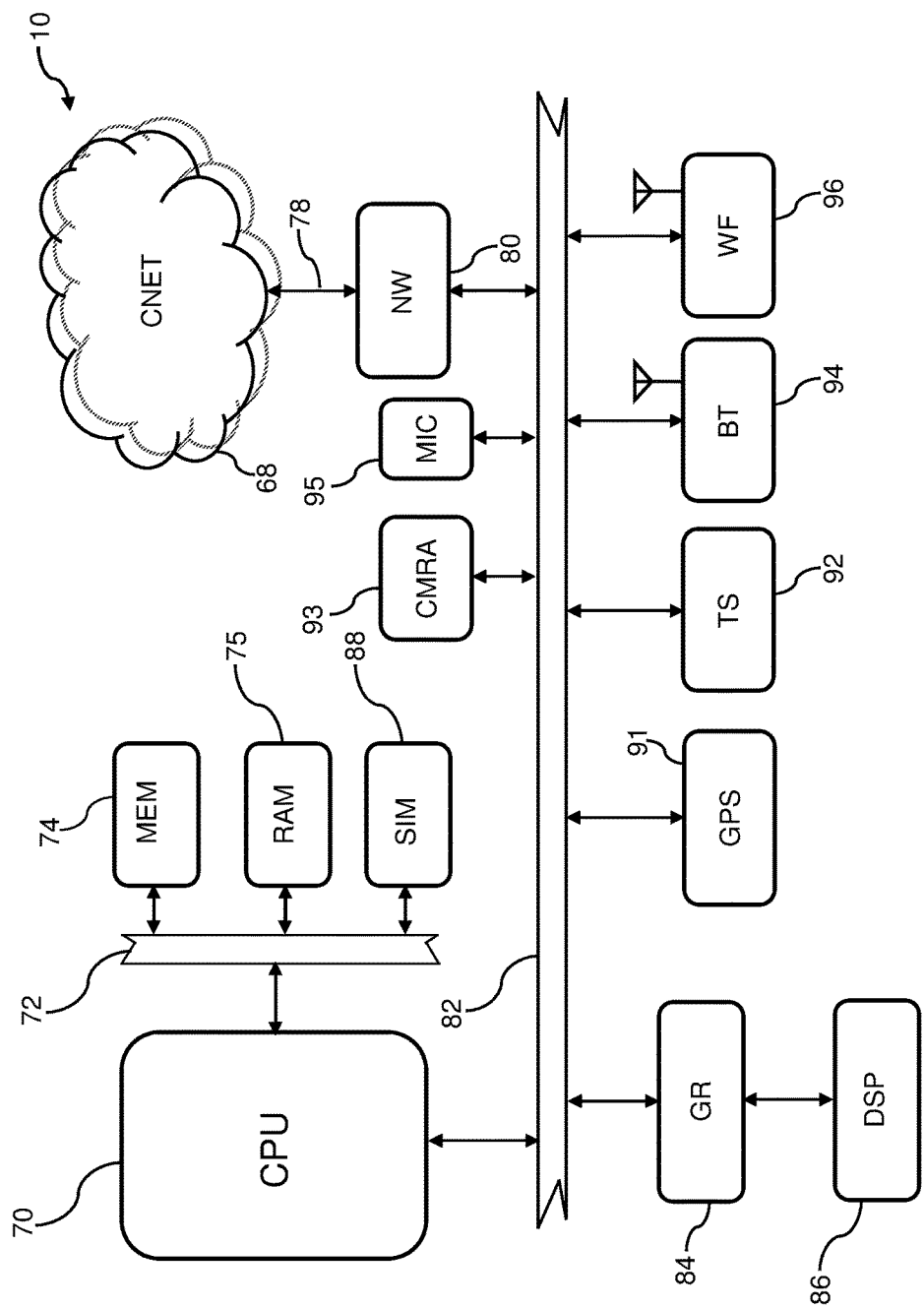
FIG. 2 illustrates a schematic view of a typical cell phone.

Referring to FIG. 2, a schematic view of a typical cell phone 10 is shown. The premise access system is described using a processor-based device (e.g., cell phone 10) for providing the login and interfaces necessary for determining at which premise the prospective buyer is closest and determining if the buyer is approved to access such premise. A cell phone 10 is currently the best known device for performing such task, though the present invention is in no way limited to using a cell phone 10 (e.g., smart phone, cellular phone, portable digital assistant, etc.) and any similar device is anticipate.

The example cell phone 10 represents a typical device used for accessing user interfaces of the property access system. This exemplary cell phone 10 is shown in its simplest form. Different architectures are known that accomplish similar results in a similar fashion and the present invention is not limited in any way to any particular cell phone 10 system architecture or implementation. In this exemplary cell phone 10, a processor 70 executes or runs programs in a random access memory 75. The programs are generally stored within a persistent memory 74 and loaded into the random access memory 75 when needed. Also accessible by the processor 70 is a SIM (subscriber information module) card 88 having a subscriber identification and often persistent storage. The processor 70 is any processor, typically a processor designed for phones. The persistent memory 74, random access memory 75, and SIM card are connected to the processor by, for example, a memory bus 72. The random access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary cell phones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, phone numbers, contacts, and data, etc. In some embodiments, other data is stored in the persistent memory 74 such as audio files, video files, text messages, etc.

The peripherals are examples and other devices are known in the industry such as Global Positioning Subsystem 91, speakers, microphones, USB interfaces, camera 93, microphone 95, Bluetooth transceiver 94, Wi-Fi transceiver 96, image sensors, temperature sensors, etc., the details of which are not shown for brevity and clarity reasons.

The cellular network interface 80 connects the cell phone 10 to the cellular network 68 through any cellular band and cellular protocol such as GSM, TDMA, LTE, etc., through a wireless medium 78. There is no limitation on the type of cellular connection used. The cellular network interface 80 provides voice call, data, and messaging services to the cell phone 10 through the cellular network 68.

For local communications, many cell phones 10 include a Bluetooth transceiver 94, a Wi-Fi transceiver 96, or both. Such features of cell phones 10 provide data communications between the cell phones 10 and data access points and/or other computers such as a personal computer (not shown). One way for the cell phone 10 to initiate access through certain locks and/or lockboxes is through transmission (preferably encrypted) over the Bluetooth radio 94 and/or the Wi-Fi radio 96, as will be described.

Figure 3:
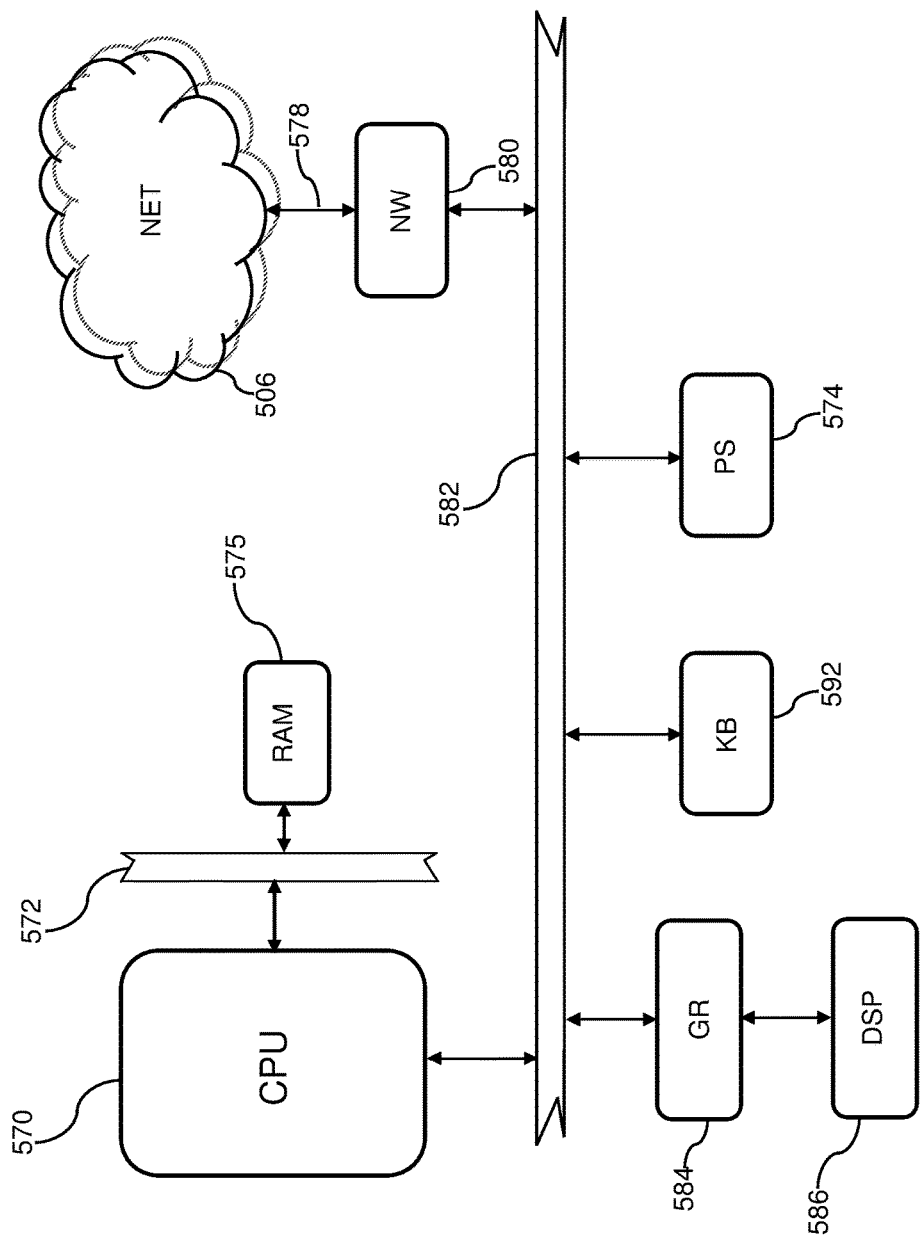
FIG. 3 illustrates a schematic view of a typical computer system such as a server or personal computer.

Referring to FIG. 3, a schematic view of a typical computer system (e.g., server 500) is shown. The example computer system 500 represents a typical computer system used for back-end processing, generating reports, displaying data, etc. This exemplary computer system is shown in its simplest form. Different architectures are known that accomplish similar results in a similar fashion and the present invention is not limited in any way to any particular computer system architecture or implementation. In this exemplary computer system, a processor 570 executes or runs programs in a random access memory 575. The programs are generally stored within a persistent memory 574 and loaded into the random access memory 575 when needed. The processor 570 is any processor, typically a processor designed for computer systems with any number of core processing elements, etc. The random access memory 575 is connected to the processor by, for example, a memory bus 572. The random access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 (e.g., disk storage) is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, contacts, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Referring to FIGS. 4-23, exemplary user interfaces of the property access system are shown. Although many user interfaces are anticipated, one set of examples are shown for brevity reasons. Some of the user interfaces utilize a browser running on the user device (e.g., a computer as shown in FIG. 3), while some of the examples shown are generated/managed by an application that runs on the user device (e.g. cell phone 10). For brevity, in the remainder of the description, the user device will be referenced as a cell phone 10.

Referring to FIG. 3, a simplified loan application 380 is presented. Loan applications are well known in the industry, so the loan application 380 is very brief as it is known that loan applications often require many pages of information regarding employers, assets, earnings, references, bank accounts, credit card information, outstanding loans, previous residences, previous employment, etc. Only very basic information is shown in the loan application 380 depicted in FIG. 4 such as name, social security number (or any other tax identification number used in non-US countries), salary per week/month/year, etc.

Figure 5:
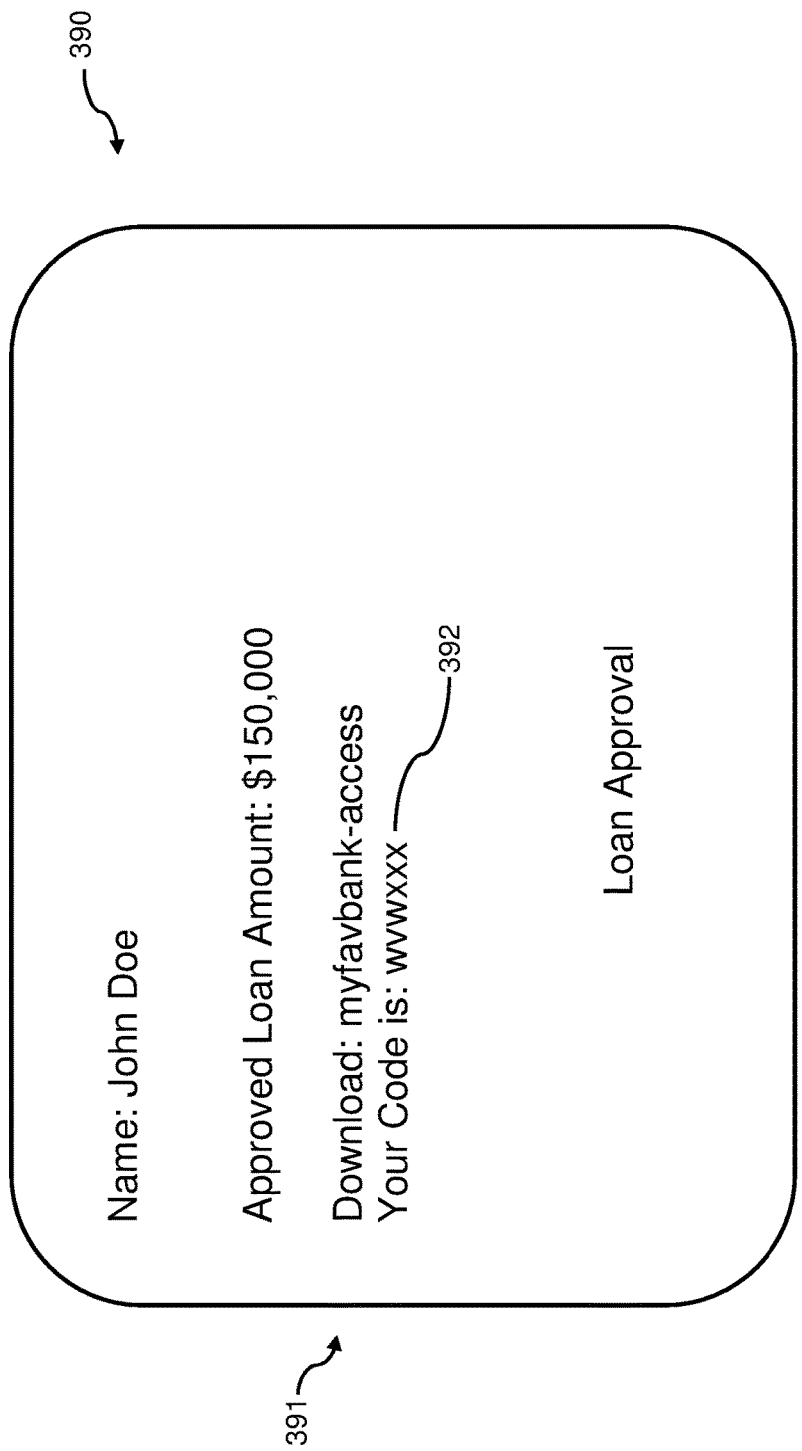
FIG. 5 illustrates a second computer user interface of the property access system showing that a loan has been approved and providing access codes.
Figure 6:
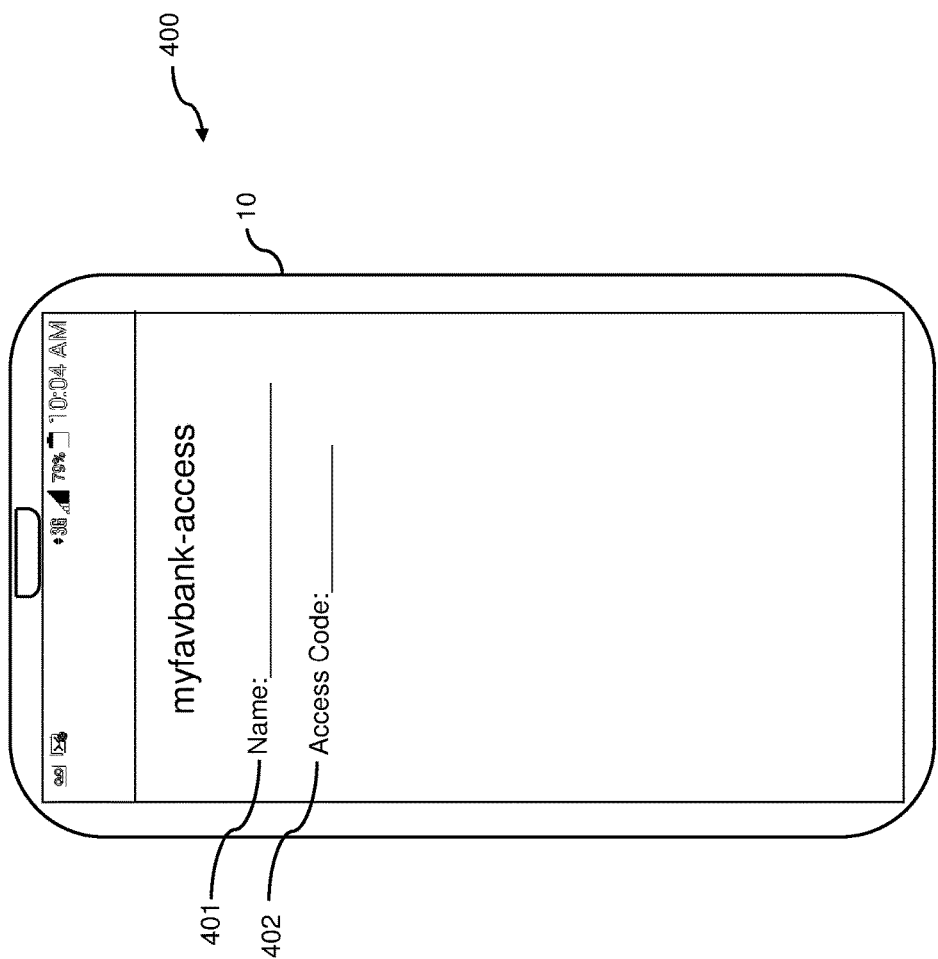
FIG. 6 illustrates an exemplary cell phone user interface of the property access system showing a startup interface for creating an account using the approval access code.

At some time after the loan paperwork is completed (not shown) and submitted, hopefully, the prospective buyer (borrower) is approved for a certain loan amount as shown in FIG. 5. Also, in FIG. 5, instructions 391 are provided for downloading a specific application that is sponsored or owned by the financial institution that is providing the loan (e.g., bank, credit union, savings and loan company, etc.) and, in some embodiments, an access code 392 is provided. As will be shown, the access code is provided when installing or operating the application to authenticate the prospective buyer.

Figure 7:
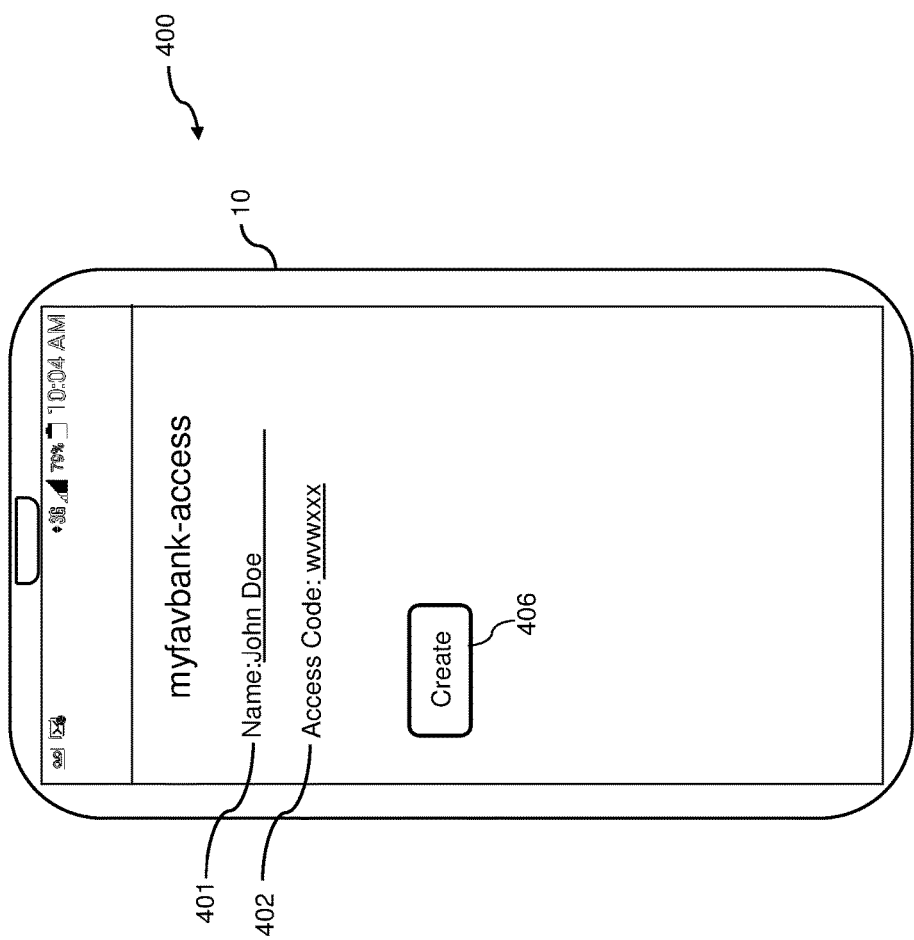
FIG. 7 illustrates a second exemplary cell phone user interface of the property access system showing entering of the approval access code for creating an account.
Figure 8:
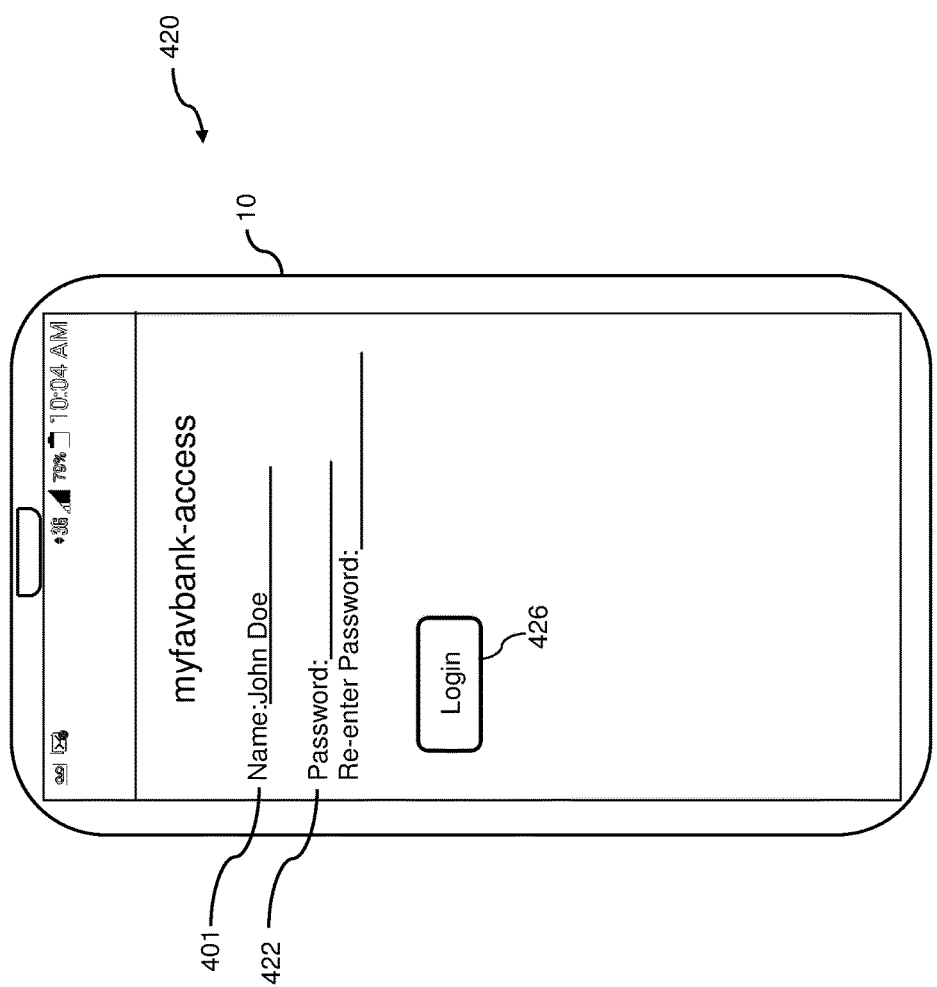
FIG. 8 illustrates a third cell phone user interface of the property access system showing an interface for creating a login password.

The application is downloaded, installed and initiated on the prospective buyer's cell phone 10 as known in the industry. In this example interface 400 of FIG. 6, upon startup, the application identifies itself (name of the financial institution) and requests information such as the prospective buyer's name 401 and the access code 402 (e.g., the access code 392 displayed in FIG. 5). In FIG. 7, the prospective buyer has entered his/her name 401 and the provided access code 402 and, when ready, invokes a "create" action 406 that initiates transactions with the server to validate the name 401 and access code 402.

Figure 9:
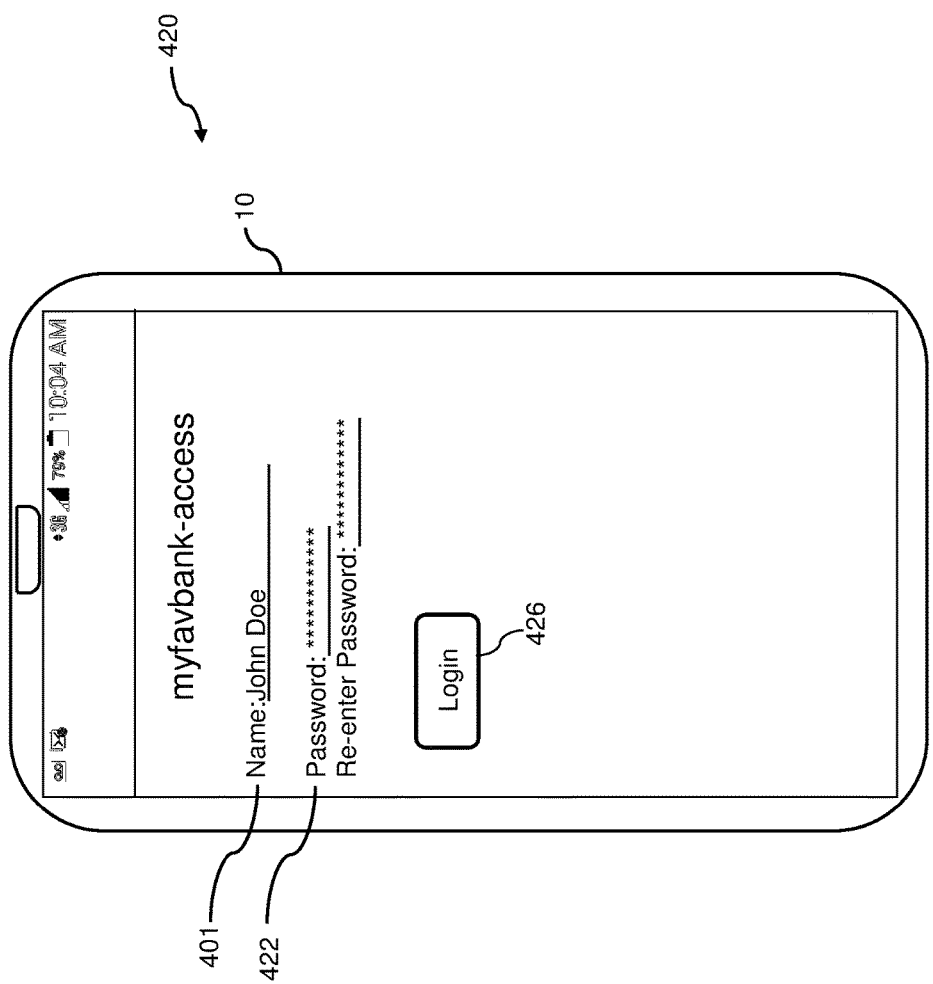
FIG. 9 illustrates a fourth cell phone user interface of the property access system showing the interface for creating a login password with data.

If the name 401 and access code 402 are incorrect, an error message is displayed. If the name 401 and access code 402 are correct, another user interface 420 is presented requesting the prospective buyer create a password 422 to permit future access of the application. Once the prospective buyer enters and re-enters their desired password 422 (as shown in FIG. 9), the prospective buyer invokes the "login" action 426 to access features of the access application. A similar login user interface is provided for re-entry into the application.

Figure 10:
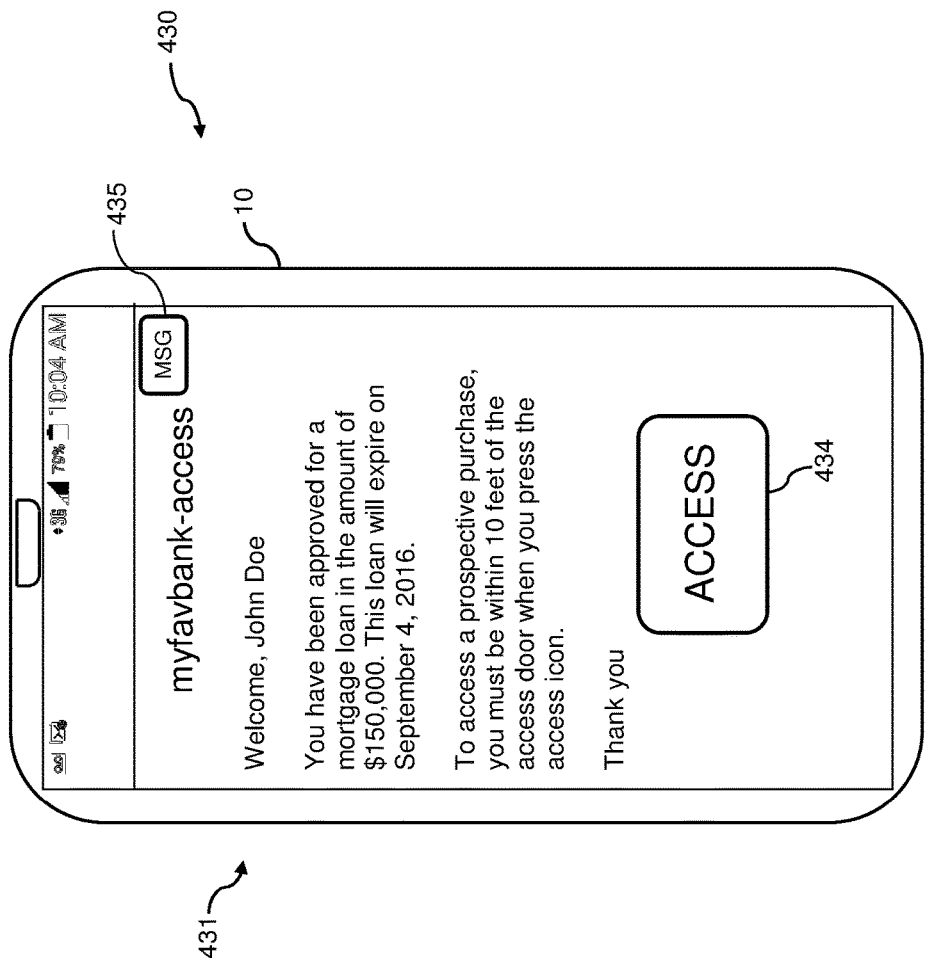
FIG. 10 illustrates a fifth cell phone user interface of the property access system showing a summary of loan data.

In the user interface 430 of FIG. 10, the prospective buyer is shown a message 431 indicating confirmation of the approval of a loan (e.g., approved in the amount of $150,000) and provided instructions as to how to access a given property along with an "access" icon 434. In this example, when the prospective buyer is within 10 feet of a premise into which they wish to enter, the prospective buyer invokes the "access" icon 434. Also, in this exemplary user interface 430, a message icon 435 is displayed, indicating that there is a message waiting to be viewed by the prospective buyer.

Figure 11:
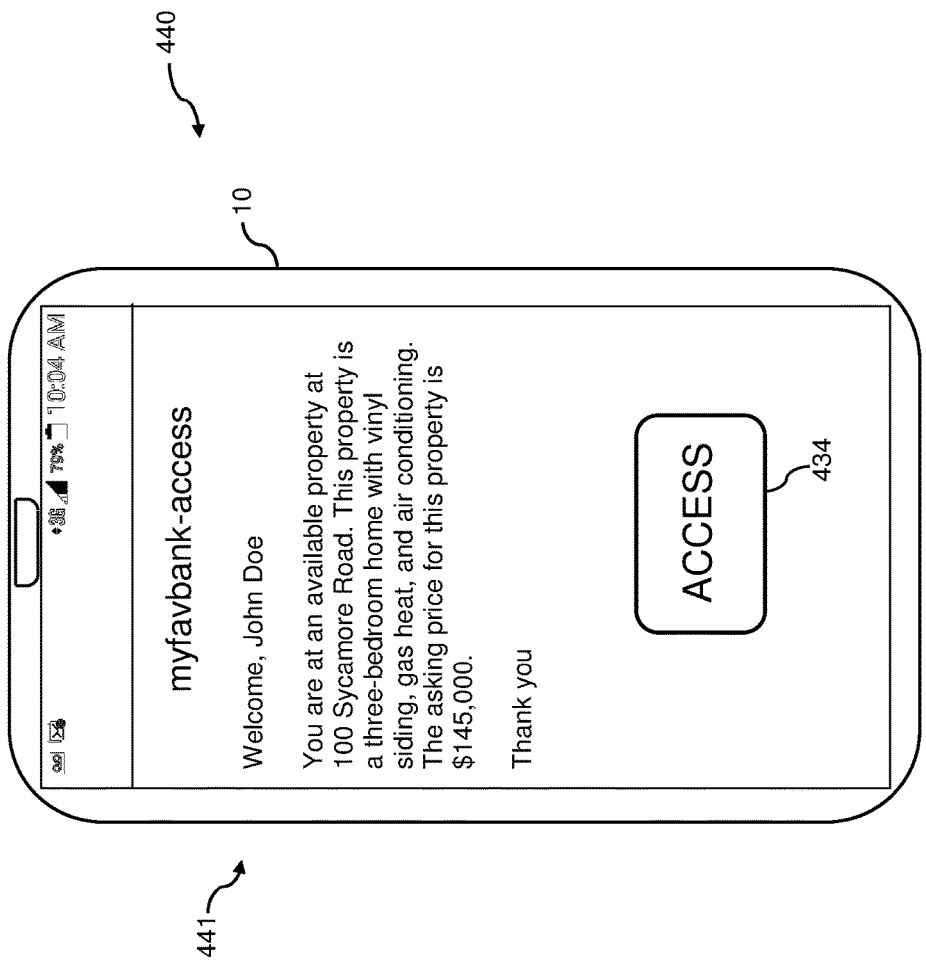
FIG. 11 illustrates a sixth cell phone user interface of the property access system showing arrival at a property.
Figure 12:
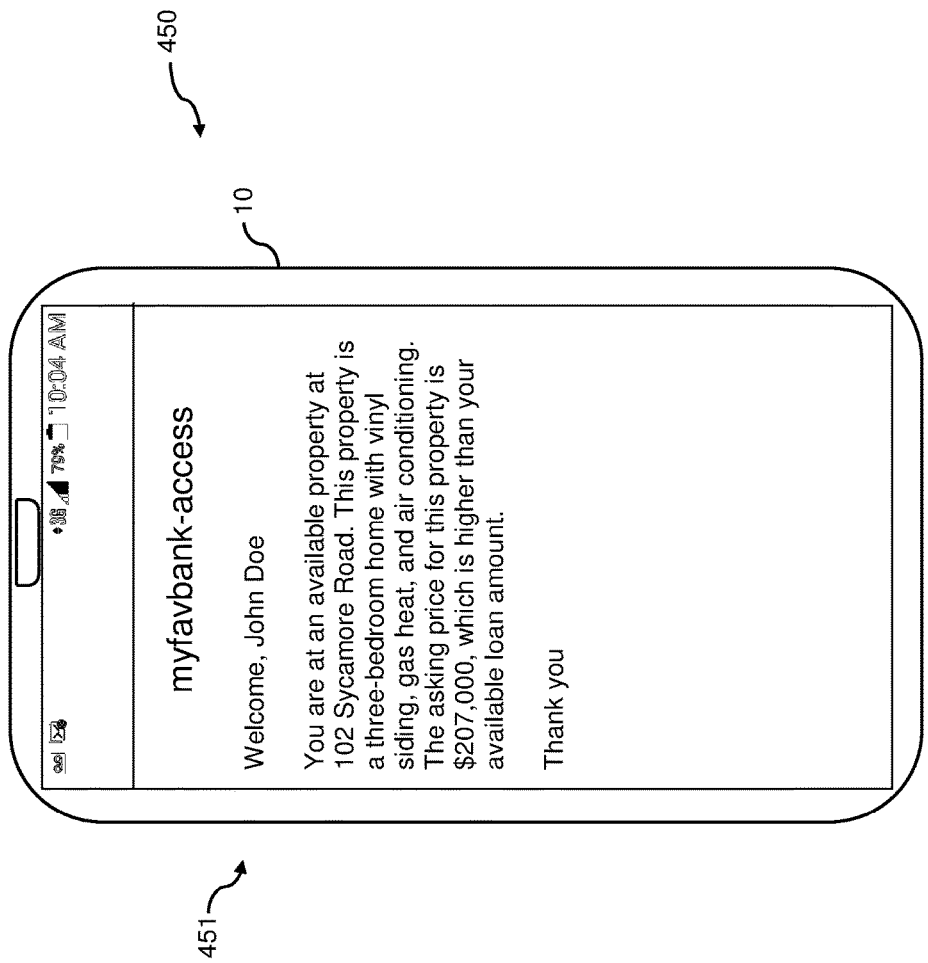
FIG. 12 illustrates a seventh cell phone user interface of the property access system showing arrival at a property that is priced too high for the prospective buyer.

In FIG. 11, a premise information interface 440 is shown, indicating that the prospective buyer is within range of a premise. In this example, the premise is at 100 Sycamore road. Also, in this example, a brief description 441 is provided, though any amount of listing information is anticipated, including pictures, features, community information, etc. Since, in this example, the buyer is approved for $150 and the listing price of the premise is within range (commensurate) of the prospective buyer's approved loan amount ($150,000), the prospective buyer has the ability to access the premise by invoking the "access" icon 434. In contrast, in the interface 450 of FIG. 12, the prospective buyer is at a different premise of which the asking price is $207,000 described in text 451, but the asking price of this property exceeds the prospective buyer's approved loan amount by $57,000, and therefore, no "access" icon 434 is displayed. In some embodiments, the prospective buyer is provided access only to properties that are commensurate (within range) of the prospective buyer's approved loan amount and/or a pre-determined amount above as it is anticipated that there is flexibility in the asking price. For example, the prospective buyer is provided access to properties that are listed at up to 10% greater than the approved loan amount or $10,000 greater than the approved loan amount, etc.

When the "access" icon 434 is present and is invoked (e.g., by tapping on the "access" icon 434), entry to the premise is permitted by any mechanism that exists, including, but not limited to, displaying a combination for entry by the prospective buyer at a combination lock on the premise, displaying a combination for opening a lock box at the premise, sending a wireless signal (e.g., radio frequency or infra-red) to an electronic door lock mechanism 8 (see FIG. 1), sending a wireless signal (e.g., radio frequency or infra-red) to an electronic lock box 9 (see FIG. 1), etc. In embodiments in which a signal or combination is sent/provided to/for an electronic lockbox 9 or combination lock box, the lockbox is opened, exposing a physical key for the premise. In embodiments in which a signal is sent to an electronic door lock 8, the premise is unlocked by the signal. In embodiments in which a door combination is provided, the combination is entered on a door combination lock to open the door. The net result is that the prospective buyer is provided access to the premise (e.g., a door is opened) and the prospective buyer has the ability to walk about the premise at their leisure. In this way, although not precluded, the prospective buyer has access to the premise without supervision from the realtor, though data is recorded regarding entry to the premise by the prospective buyer and, it is also anticipated that one or more surveillance cameras provide added security at the premise and/or steps taken by the prospective buyer are recorded by the application running on the cell phone 10.

Figure 13:
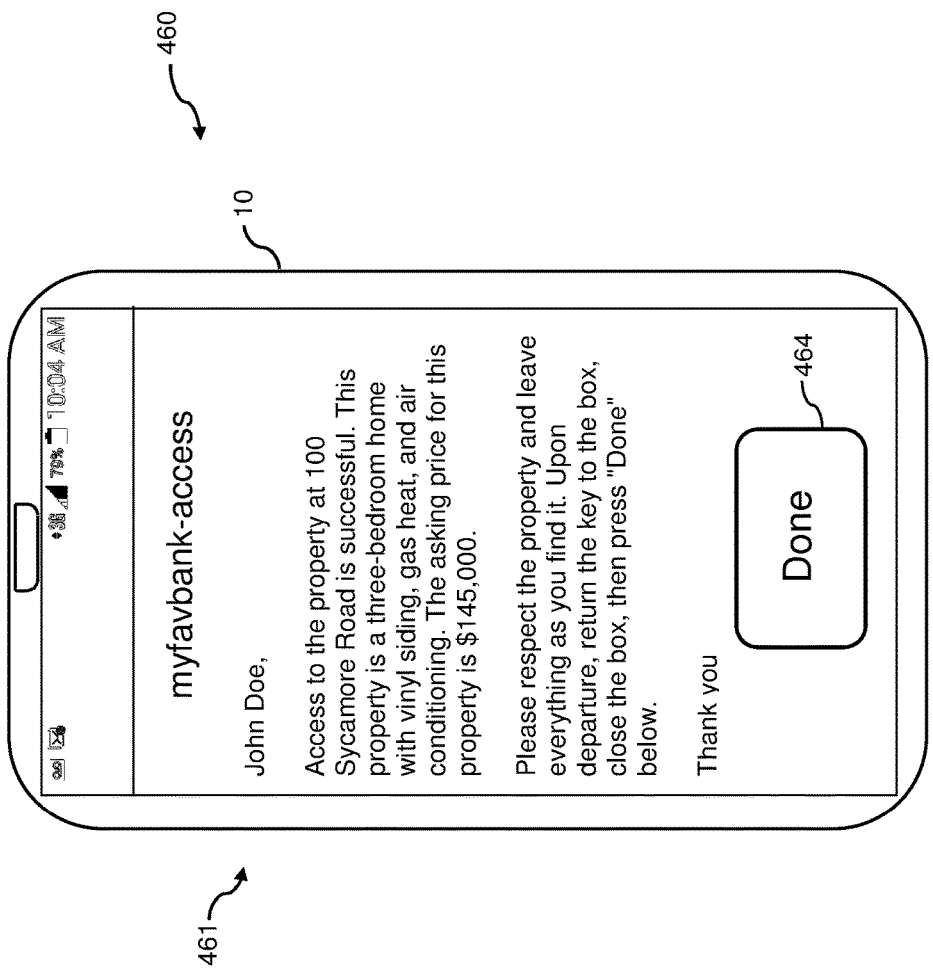
FIG. 13 illustrates an eighth cell phone user interface of the property access system showing that access has been provided and requesting acknowledgement from the prospective buyer when done.

Also in FIG. 13 is a "done" icon 464. After the prospective buyer reviews the premise and is ready to leave, the prospective buyer invokes the "done" icon 464. Invoking of the "done" icon 464 provides data to the listing agent or seller of the property as to the length of time that the prospective buyer spent in/at the premise and an indication that the property is now vacant, should the home seller be purposely out while the prospective buyer tours the premise. In some embodiments, a description of the premise 461 is also displayed for review by the prospective buyer. In some embodiments, data regarding the visit and the premise is sent to the prospective buyer by, for example, email, etc.

In some cases, the prospective buyer forgets to invoke the "done" icon 464 after, hopefully, locking the premise. If this happens, in some embodiments, the application running on the cell phone detects that the prospective buyer is further from the premise than a predetermined distance (e.g., is greater than 100 feet from the access door to the premise or is greater than 10 feet beyond a property line of the premise, etc.) and the application automatically invokes the same functionality, as if the "done" icon 464 was invoked. In some embodiments, arrival at a different premise also invokes the "done" functionality.

Figure 14:
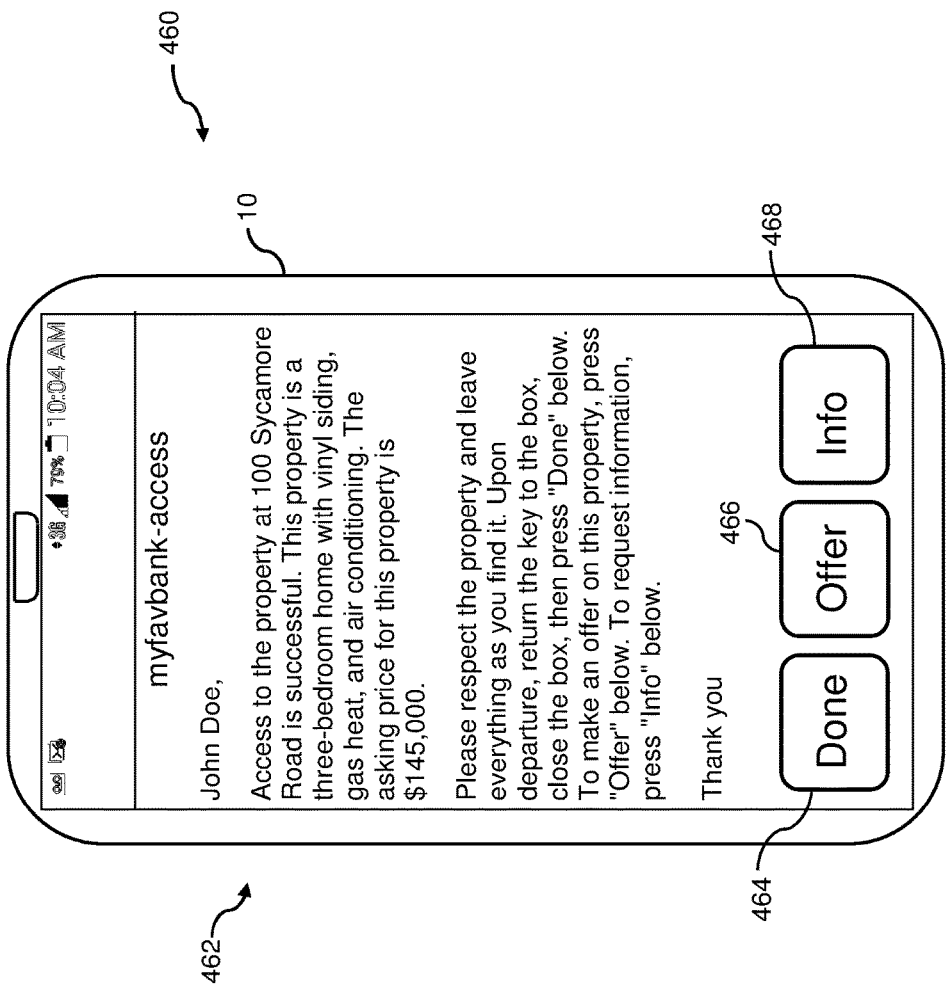
FIG. 14 illustrates a ninth cell phone user interface of the property access system showing that access has been provided and requesting either acknowledgement from the prospective buyer when done, requesting information, or making of an offer.

In FIG. 14, the interface 460 has a slightly different description that includes the "done" icon 464 with the addition of an "offer" icon 466 and an "info" icon 468. The "done" function 464 operates as described above. The prospective buyer invokes the "offer" icon 466 to make an offer on the premise and invokes the "info" icon 468 to request further information regarding the premise. Again, in some embodiments if the prospective buyer forgets to invoke the "done" icon 464 after, hopefully, locking the premise, if the application running on the cell phone 10 detects that the prospective buyer is further from the premise than a predetermined distance (e.g., is greater than 100 feet from the access door to the premise or is greater than 10 feet beyond a property line of the premise, etc.), the application automatically invokes the same functionality, as if the "done" icon 464 was invoked. In some embodiments, arrival at a different premise also invokes the "done" functionality.

Figure 15:
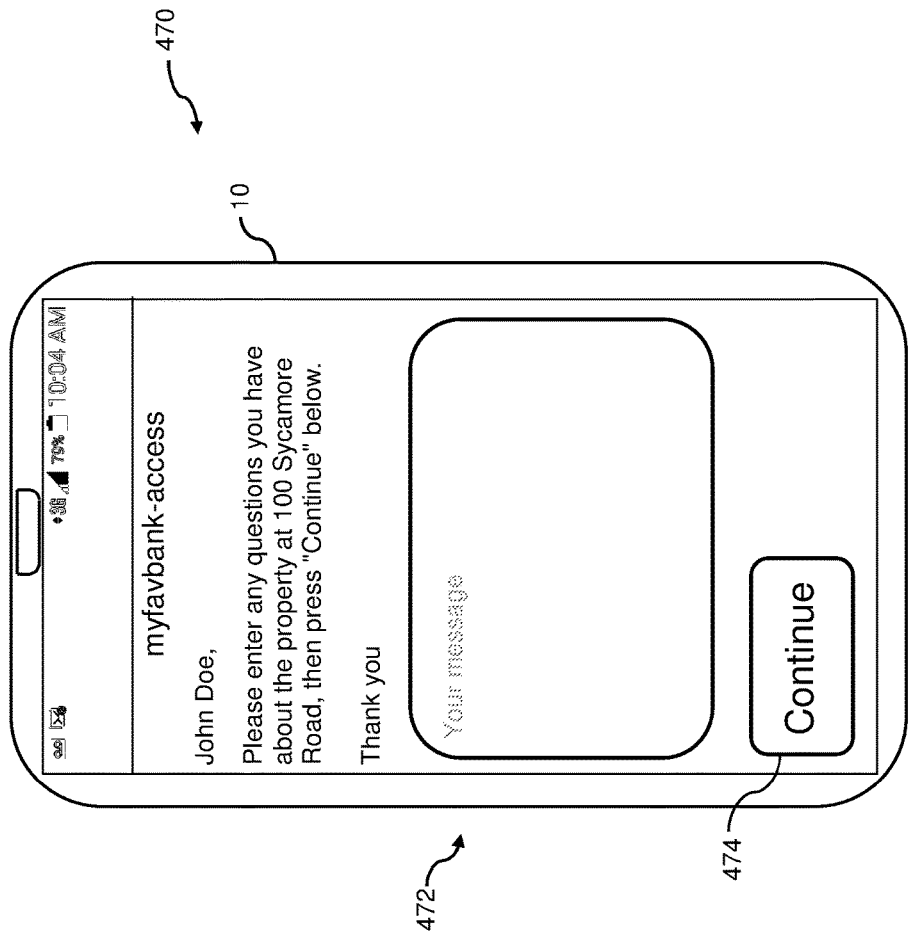
FIG. 15 illustrates a tenth cell phone user interface of the property access system showing a mechanism for the prospective buyer to enter a query regarding the current property.

In FIG. 15, the prospective buyer has invoked the "info" icon 469 and an information request interface 470 is displayed including an area 472 for the prospective buyer to include questions that they have regarding the property (e.g., do the lighting fixtures remain, was there water in the basement, etc.). After entering their question(s), the prospective buyer invokes the "continue" icon 474 and the question is sent to the listing agent/seller for answering. An answer is later sent and appears as a message to the prospective buyer or an email is sent directly to the buyer, etc.

Figure 16:
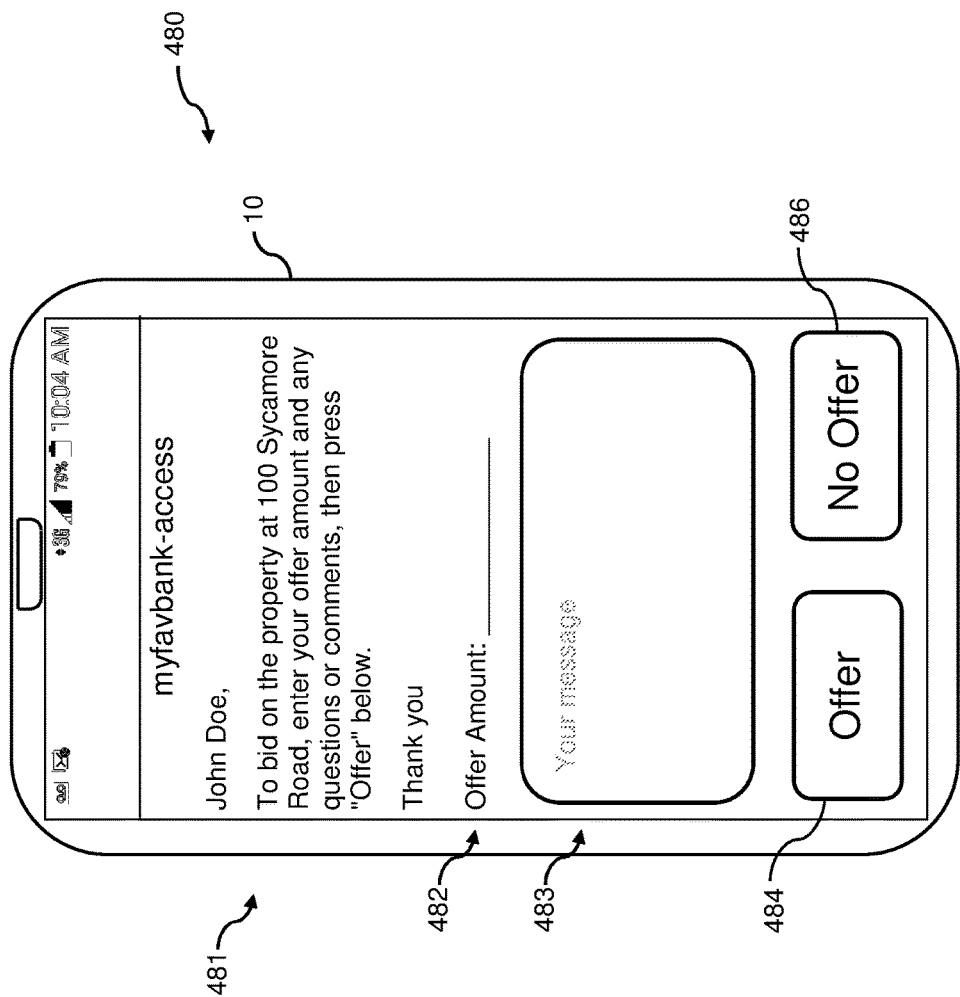
FIG. 16 illustrates a eleventh cell phone user interface of the property access system showing an interface for making an offer.

It the prospective buyer invoked the "offer" icon 466; an offer user interface 480 as in FIG. 16 is displayed. In this example, the offer interface 480 includes a summary of the property 481, a place for the prospective buyer to enter an offer amount 482, a place for a message 483, an icon for making the offer 484, and an icon for not making an offer 486. In this exemplary offer user interface 480, it is anticipated that the prospective buyer enter an amount to offer 482 and possibly some requests in the message field 482 such as a desired closing date, special requests such as a desire to include certain appliances, etc. Upon invoking the "make offer" icon 484, the offer is transmitted to the listing agent/seller for consideration. If, instead, the prospective buyer decides against making an offer, the "no offer" icon 486 is invoked.

Figure 17:
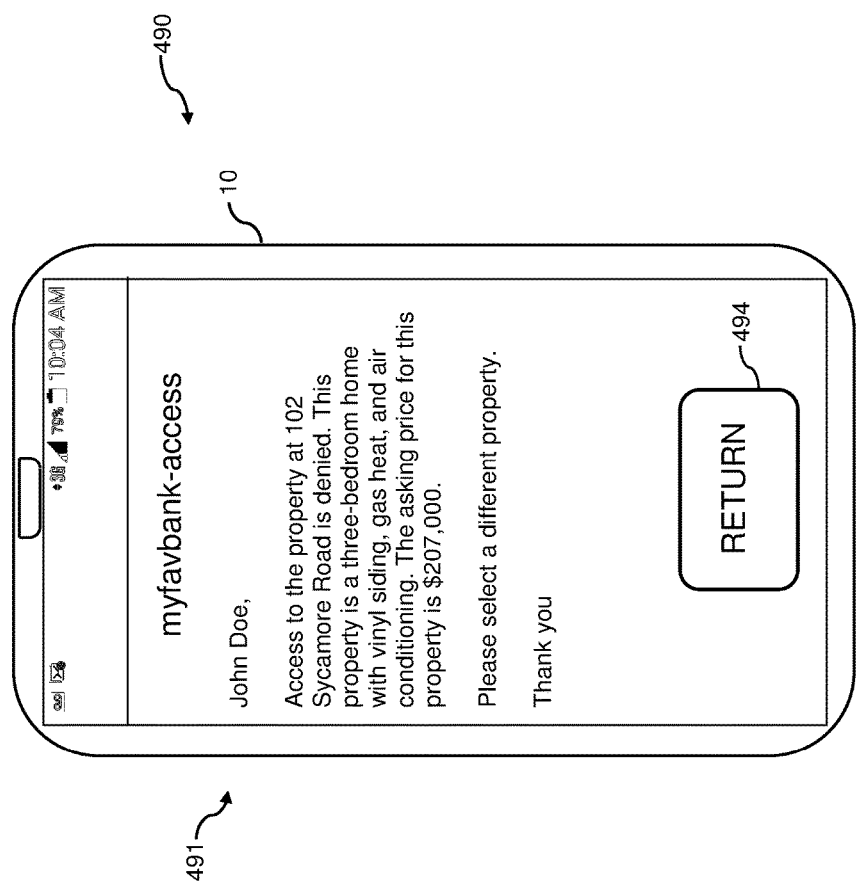
FIG. 17 illustrates a twelfth cell phone user interface of the property access system showing an alternate interface indicating that the closest property is priced out of range of the prospective buyer.

In FIG. 17, a refused-access user interface 490 is shown including a message 491 indicating why the prospective buyer was refused access and a "return" icon 494 for exiting. The refused-access user interface 490 is displayed if, for some reason, the prospective buyer invokes the "access" icon and for some reason access is denied (e.g., loan amount is too low compared to the asking price).

Figure 18:
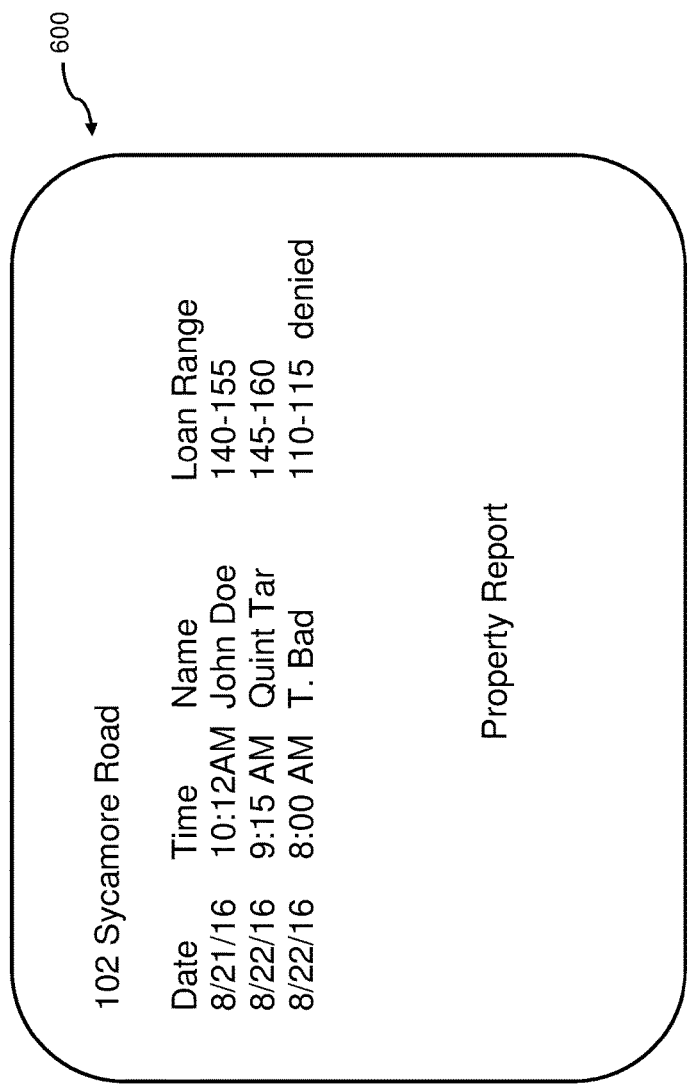
FIG. 18 illustrates a computer user interface of the property access system showing a list of prospective buyers that visited a particular property.

In FIG. 18, a sample property report 600 is shown. In this example, the property at 102 Sycamore Road was viewed twice (by John Doe and Quint Tar) and an unsuccessfully attempted to view was made by one prospective buyer (T. Bad). The time of access (or attempted access) is displayed along with the prospective buyers' loan range as a tool/information to the listing agent/seller. In this, if the listing agent/seller has not received a bid as desired and wants to lower the listing price, the listing agent/seller has data regarding a prospective buyer that may have not had been approved for access at the time they attempted access, but may be a prospective buyer at the new listing price, and therefore, should be consulted to revisit the premise, etc. It is anticipated that any other available information be displayed or available (e.g. through links) on the property report 600 such as amount of time the prospective buyer remained at the premise, video (if available) of the prospective buyer's visit, comments by the prospective buyer, questions from the prospective buyer, travel path of the prospective buyer, etc.

Figure 19:
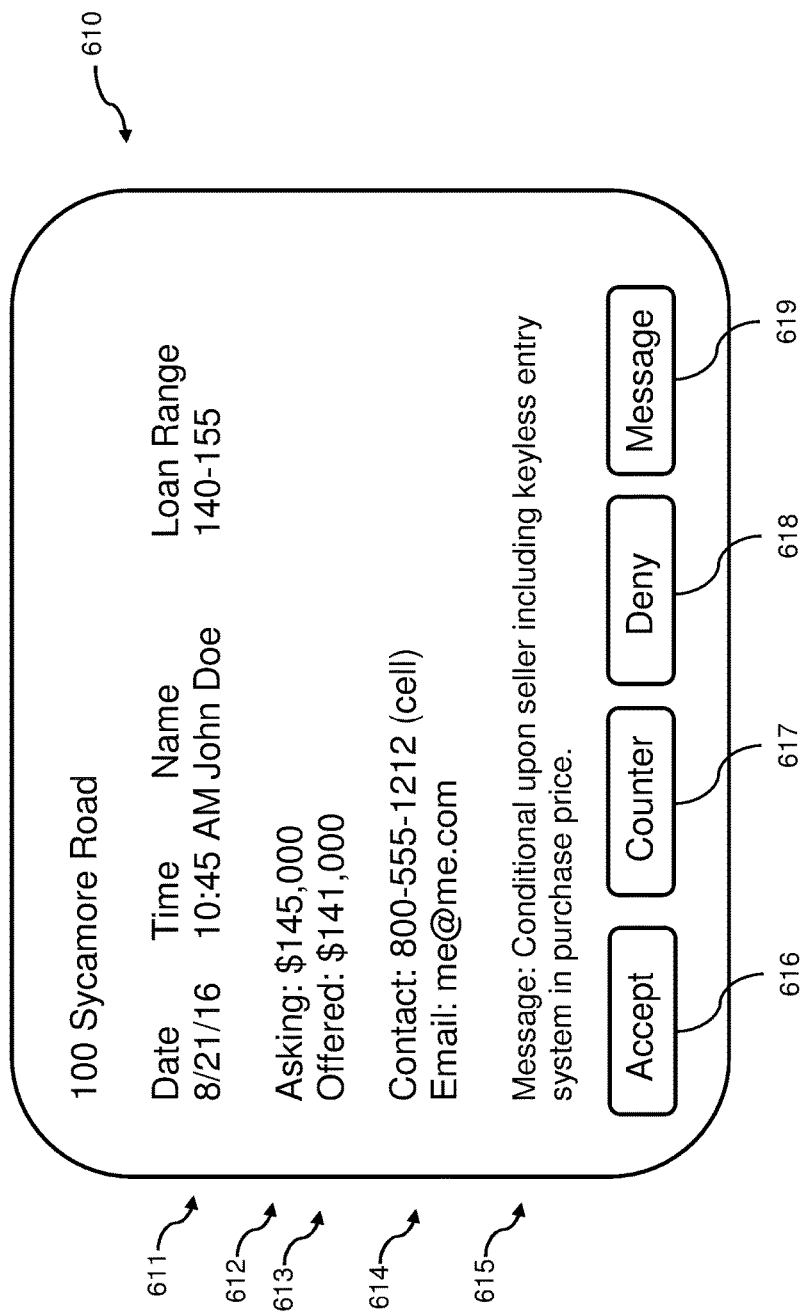
FIG. 19 illustrates a computer user interface of the property access system showing an interface for the seller/realtor to receive an offer on a particular property.

In FIG. 19, an offer request user interface 610 is shown, responsive to the prospective buyer invoking the "offer" icon 466. In this exemplary offer request user interface 610, the information entered by the prospective buyer and/or generated by the application is displayed, including the date, time and information 611 regarding the prospective buyer, the asking price 612, the offered price 613, buyer contact information 614, a message from the prospective buyer 615, etc. Upon review of the offer, the listing agent/seller has the ability to accept the offer 616, counter the offer 617, reject the offer 618, or send a message 619 to the prospective buyer.

Figure 20:
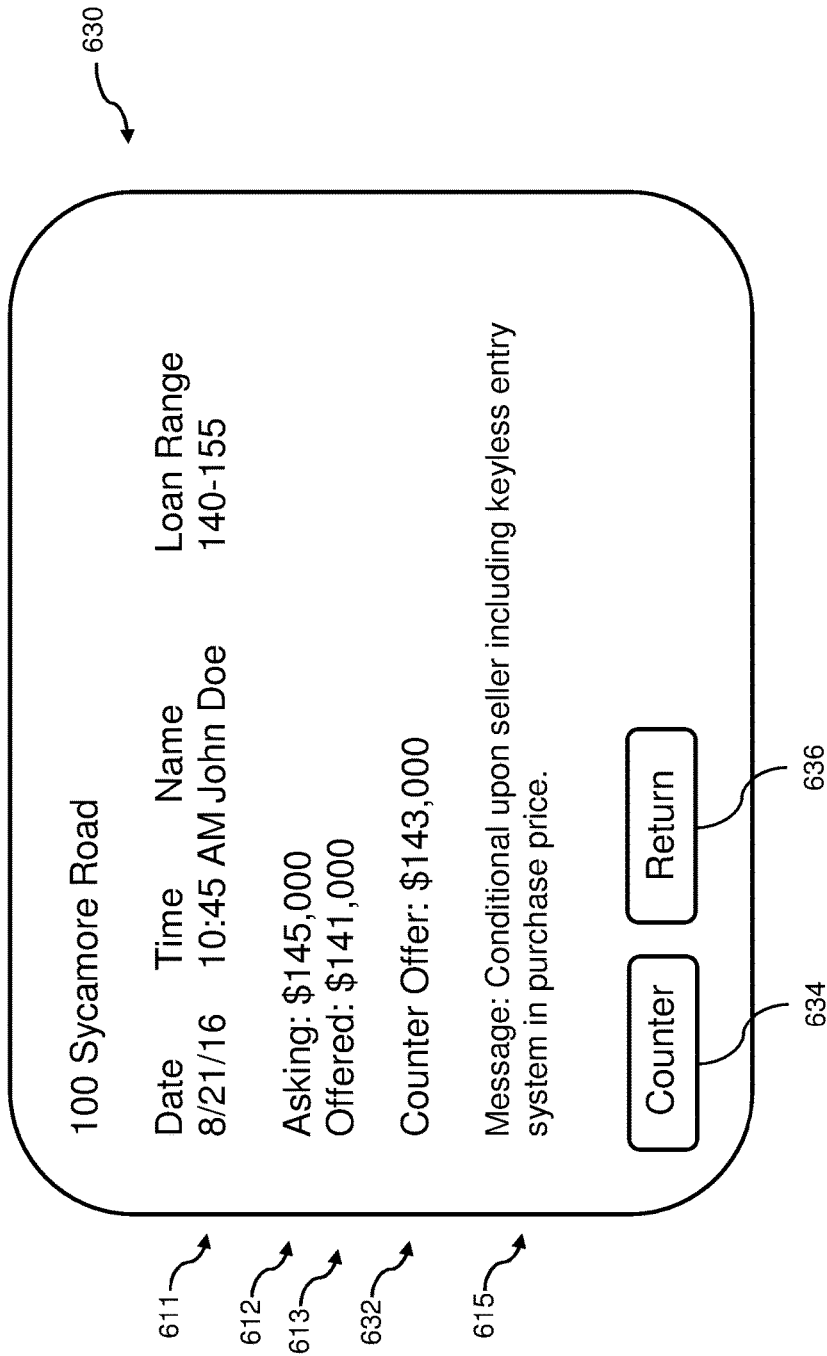
FIG. 20 illustrates a computer user interface of the property access system showing an interface for the seller/realtor to make a counter offer.

In FIG. 20, a counter offer user interface 630 is shown, in which the listing agent/seller has invoked the counter offer 617 and has entered a counter offer amount 632. In this example, the listing agent/seller then issues the counter offer 634 or returns to the prior user interface by way of the "return" 636.

Figure 21:
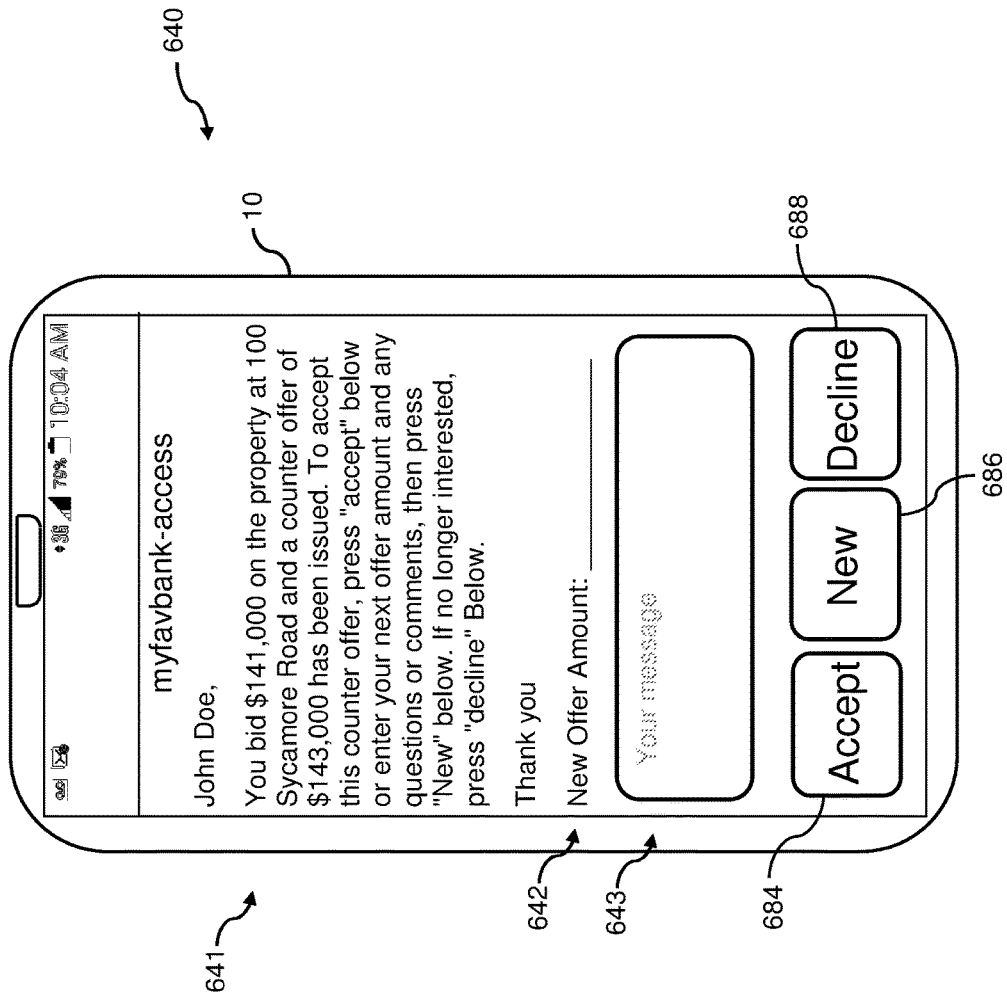
FIG. 21 illustrates a cell phone user interface of the property access system showing an interface for the prospective buyer to receive a counter offer.

In FIG. 21, the prospective buyer receives a counter offer 640, indicating the property on which they have bid along with the counter offer amount 641 (e.g., $143,000). In the counter offer 640 are the abilities to provide a new offer amount 642, add further comments/questions 643, and directives to accept the counter offer 684, make a new offer 686, or decline completely 688.

Figure 22:
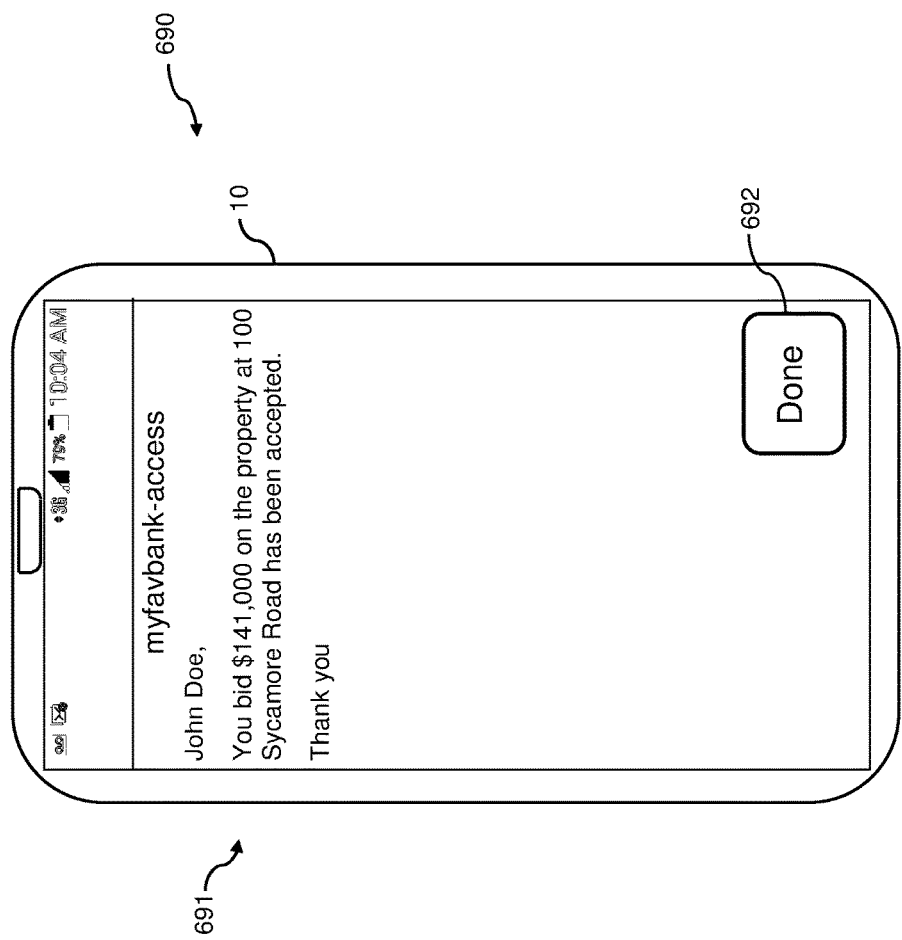
FIG. 22 illustrates a cell phone user interface of the property access system showing an interface for the prospective buyer to receive acknowledgement of acceptance of their prior offer.

If the prospective buyer accepts the offer, or makes a counter offer that is accepted by the listing agent or seller, an acceptance user interface 690 as in FIG. 22 is presented confirming acceptance. To finish, the prospective buyer selects "done" 692.

Figure 23:
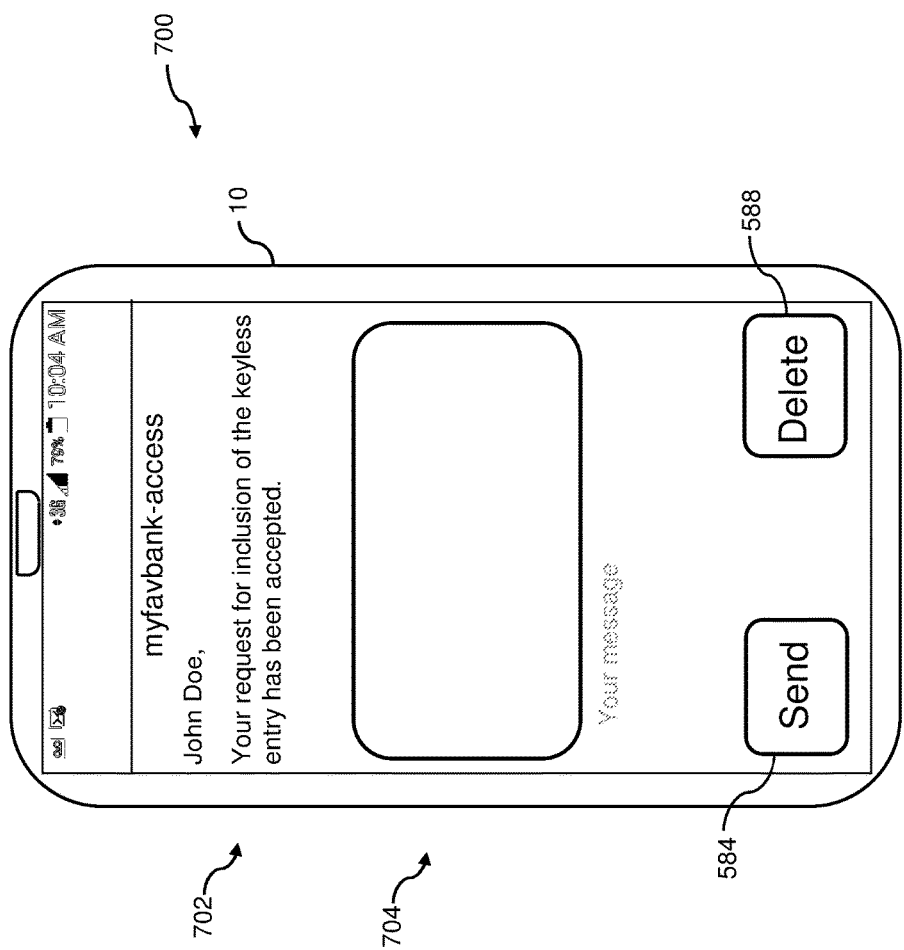
FIG. 23 illustrates a cell phone user interface of the property access system showing an interface for the prospective buyer to receive a response from the property seller or realtor.
Figure 24:
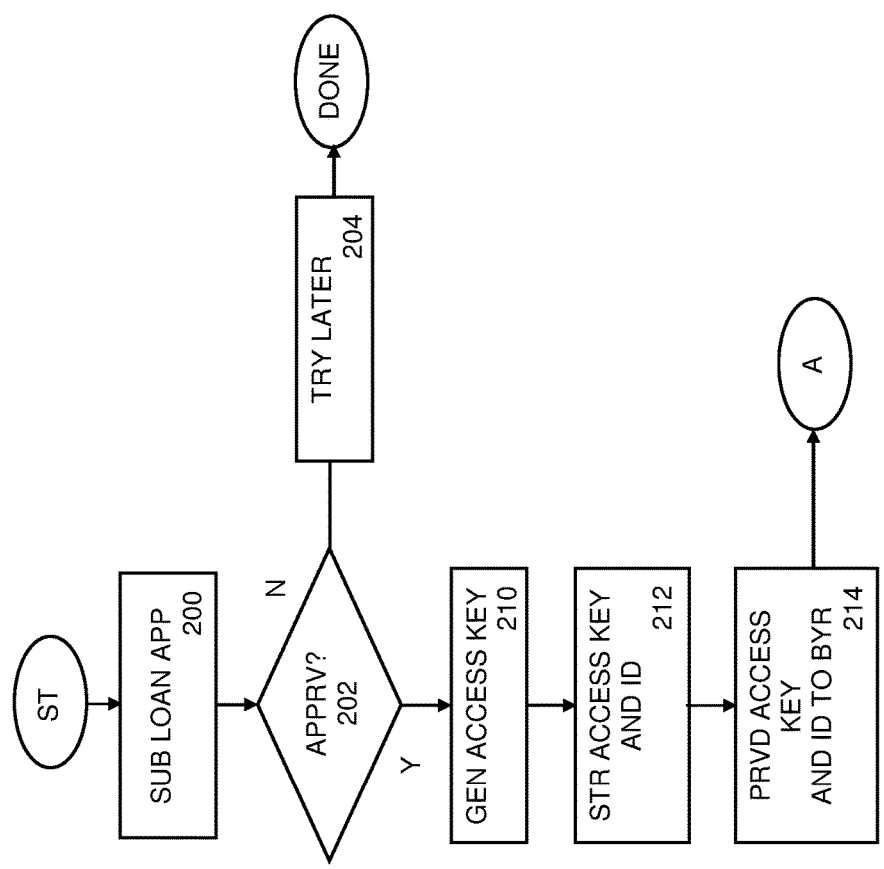
FIG. 24 illustrates an exemplary program flow of the property access system.
Figure 25:
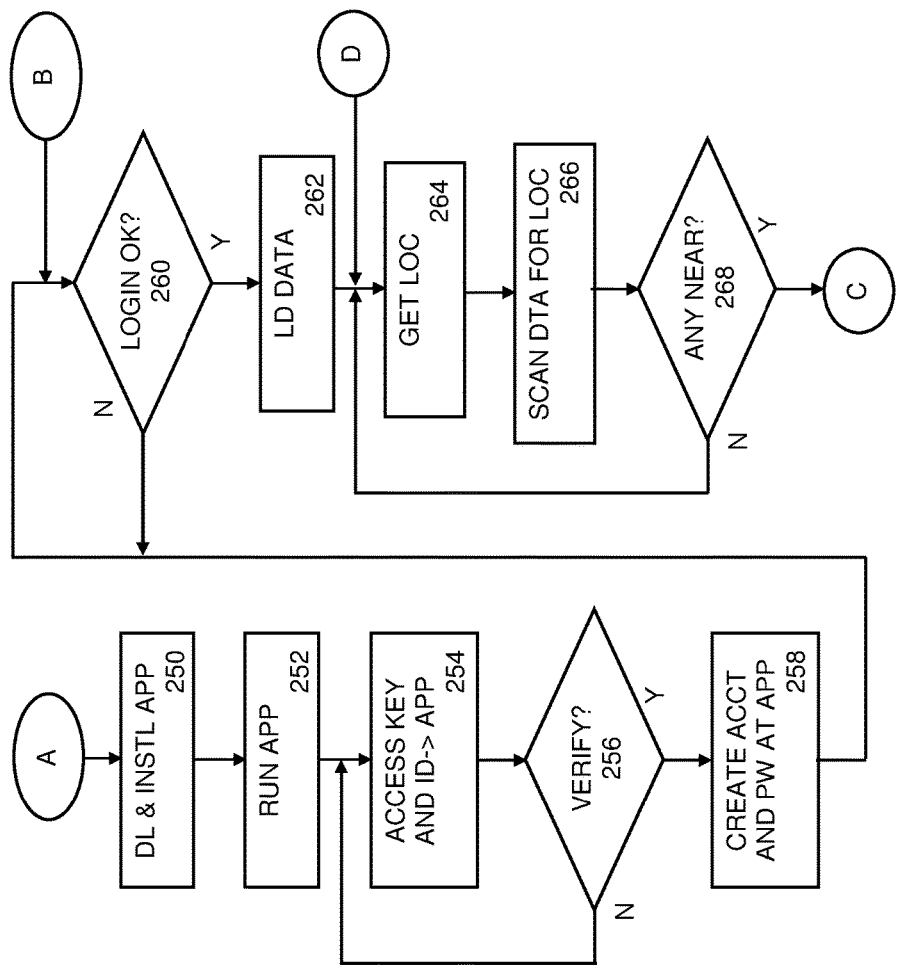
FIG. 25 illustrates a second exemplary program flow of the property access system.
Figure 26:
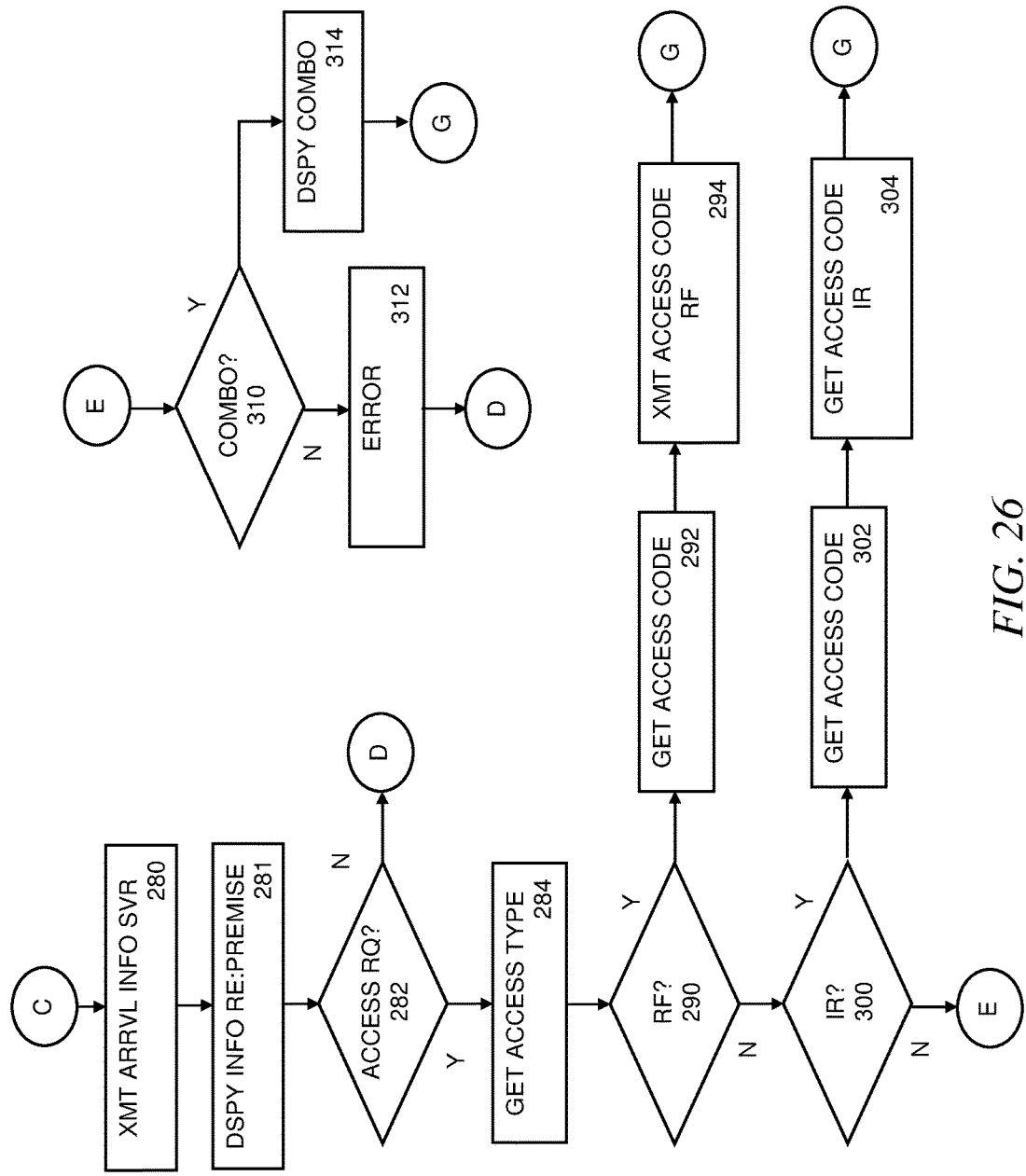
FIG. 26 illustrates a third exemplary program flow of the property access system.
Figure 27:
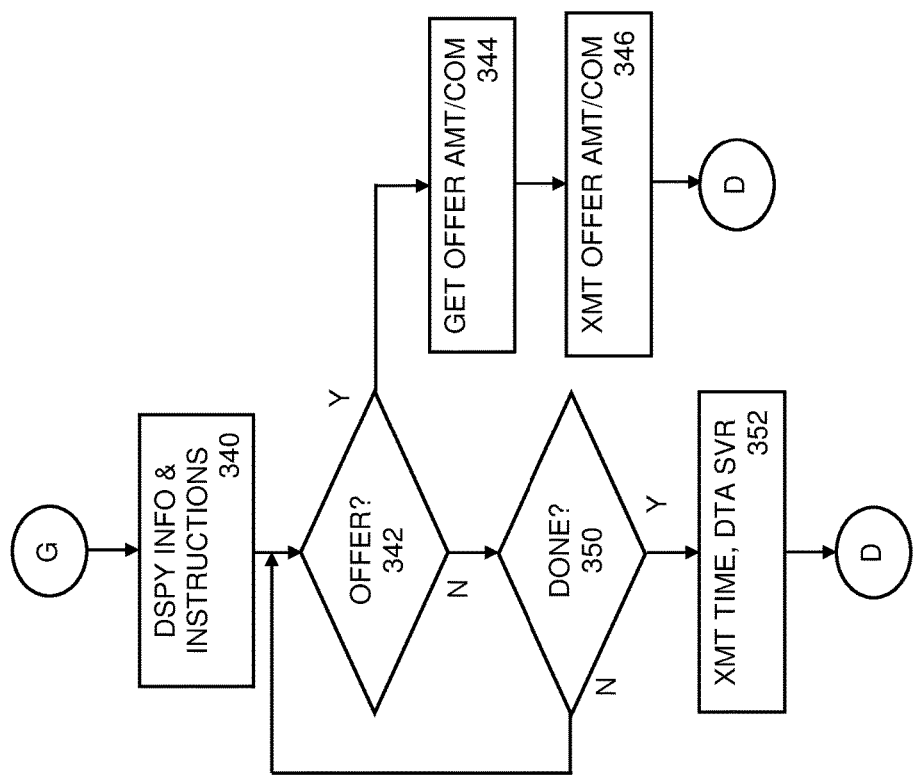
FIG. 27 illustrates a fourth exemplary program flow of the property access system.

When a message is sent from the listing agent/seller and the message icon 435 is selected (see FIG. 10), a user interface 700 as in FIG. 23 is displayed, including the message 702 and an area for providing a response 704, along with a "send" for sending the response 704 and a "delete" for discarding the message 702, etc.

Referring to FIGS. 24-27, exemplary program flows of the system for providing access are shown.

It is anticipated that portions of the exemplary program flow execute on a user device such as a cell phone 10 while portions of the exemplary program flow execute on the server 500.

In this example, the flow starts by the prospective buyer applying for a loan 200 (mortgage). This step is anticipated to be performed electronically, on paper, or more typically a combination of both. For example, the prospective buyer fills out paperwork which is then entered into a banking computer system 505.

It the loan is not approved 202, the prospective buyer need try again later 204, possibly for a smaller loan or providing additional credit information.

Once the loan is approved 202, an access key is generated 210, typically by software running on the server 500, and the access key is stored 212 along with identification information regarding the prospective buyer, for example in the data storage 502. Also, in the data storage, there are one or more premise listings that include, for example, the location of the premises, listing prices for each premise, etc.

The access key is presented 214 to the prospective buyer along with instructions for using the access key with the cell phone application. In some embodiments, the access key is presented 214 to the prospective buyer along with instructions for using the access key along with the loan approval paperwork, either electronically or on paper.

Once the prospective buyer receives the access key and instructions for using the access key, the prospective buyer downloads and installs the cell phone application 250, then runs the cell phone application 252 which displays a series of user interfaces as described, for example, in the previous figures. The prospective buyer then enters 254 the access code as received above and identification information (e.g., name of the prospective buyer, part or all of the prospective buyer's tax identification number, part or all of the loan number, etc.). The access key and information are verified 256 and if verification fails, the above entering 254 is repeated. Once the verification 256 succeeds, a user account is created 258, for example obtaining a user name and password from the prospective buyer, as known in the industry. The login information is checked 260 and once the login information is valid 260 (e.g., when logging back in at a future time), data is loaded 262 into the application.

The data loaded 262 into the application depends upon the capabilities of the prospective buyer's cell phone 10 (e.g., amount of storage) and the local cell phone connectivity. In one embodiment, all potential listings are downloaded from the storage 502 by the server 500 and stored in the memory 74 of the cell phone 10. In some embodiments, no data is stored in the memory 74 of the cell phone 10; requiring access to the server each time a property is approached. The data that is downloaded typically consists of one or more property listings, including the location of each property and the listing price of the property (e.g., description and images).

Next a loop runs. As known in the software industry, loops are often replaced by interrupt-driven routines and/or loops often are set to run periodically or have delays between iterations, etc.

The loop (D) starts by getting the location 264 of the cell phone 10, preferably by using the global positioning service 91 (GPS) of the cell phone 10, but alternately by other means such as cell tower triangulation, etc. In some embodiments, the location is determined by reception of a low power wireless signal from the locking system 8/9 at the premise.

Once the location 264 is determined, the data is scanned 266 (or the server consulted) to determine if the cell phone 10 (and hence the prospective buyer) is at any of the listed premises. If the location is not within a predetermined distance 268 of any of the listed premises, the loop (D) repeats. Typically, the predetermined distance is within sight of the access point to the premise (e.g., door) or to the lockbox 8 which is often at the access point, but sometimes secured to other objects such as a pipe or railing. Therefore, the term "near" means close to the access point or access device, for example, ten feet.

Once the location is within a predetermined distance 268 of one of the listed premises (e.g., within 10 feet of the front door of the premise), the access process begins (C).

In a preferred embodiment, once the access process begins, information is automatically transmitted 280 to the server 500 for recording. This information typically includes identification of the prospective buyer and the location or identification of the property. In some embodiments, the information is time stamped, either by the cell phone application or by the server so as to provide arrival times. In some embodiments, the information is transmitted at a different time, for example, when the prospective buyer leaves the premise, or achieves a cellular or Wi-Fi connection, etc.

If the prospective buyer doesn't request access (e.g., doesn't invoke the access function 434) or access is not permitted (e.g., the prospective buyer's loan is not sufficient for this premise), the loop continues. If the prospective buyer request access (e.g., invokes the access function 434), they type of access is determined 284, for example, by reading the listing data for that property or by sending a query to the server 500. The access type informs the cell phone application as to what type of entry lock system is used at this particular premise. Note that this step is not performed in premise access systems in which all access devices are homogeneous (e.g., all access devices are the same type such radio frequency accessed lock boxes).

If the access type is RF 290, the access code is retrieved 292, either by reading the downloaded data or consulting the server 500 and the access code is transmitted by RF 294 to the access device (e.g. RF lockbox 9 or RF keyless entry 8). The transmission step 294 is simplified, in that, there is typically a handshake in which the RF lockbox 9 or RF keyless entry 8 performs error checking and acknowledges operation (or indicates failure). Once the access is successful, the departure steps (G) are operated (see FIG. 27).

If the access type is IR (infra-red) 300, the access code is retrieved 302, either by reading the downloaded data or consulting the server 500 and the access code is transmitted by IR 304 to the access device (e.g. IR lockbox 9 or IR keyless entry 8). The transmission step 304 is simplified, in that, there is sometimes a handshake in which the IR lockbox 9 or IR keyless entry 8 performs error checking and acknowledges operation (or indicates failure). Once the access is successful, the departure steps (G) are operated (see FIG. 27).

The departure steps (G) include displaying 340 information and/or instructions such as data regarding the premise and instructions for the prospective buyer while inside the premise and instructions regarding when the perspective buyer leaves the premise. Next, the application waits for the done function 464 or offer function 466 to be invoked. If the prospective buyer is finished reviewing the premise, the prospective buyer locks the door and returns the key to the lockbox 9 or closes the door and locks it as directed then invokes the done function 464. When the done function 464 is invoked, the test for done 350 is yes and data is transmitted 352 to the server 500, for example, the time of completion or just an indication of completion which is later time stamped by the server 500. If the prospective buyer wants to make an offer, the prospective buyer invokes the offer function 466 (as previously described) resulting in the test for an offer 342 being true and the application collects 344 the offer amount of the offer and any communications/notes and transmits 346 the offer amount of the offer and any communications/notes to the server, where the offer is then stored and relayed to the listing agent and/or seller of the premise. The response to the offer and counter offers follow similar flow and are not shown for brevity and clarity reasons.

In some embodiments, the test for done 350 includes a test for location being a certain distance from the premise (as read from a GPS 91), such as 100 feet from the access point or ten feet outside of the property line of the premise, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for premise access, the system comprising:
a device for accessing the system by a prospective buyer, the device having a location determining subsystem;
a server, the server having a set of currently available premise listings;
a pre-approved loan obtained by the buyer and having a pre-approved loan amount;
an application running on the device downloads a set of currently available premise listings and the application generates a subset of currently available premise listings in which an asking price for each of the listings in the subset is less than 110% of the pre-approved loan amount, and stores the subset of the currently available premise listings at the device, the subset of currently available premise listings including a location of each available premise;
upon arrival near a particular premise that corresponds to one of the subset of currently available premise listings as determined by comparing a location of the device to stored locations corresponding to each of the currently available premise listings in the subset of currently available premise listings, the application provides an access code for the particular premise.

2. The system of claim 1, whereas the access code is provided by displaying a combination on a display of the device for access.

3. The system of claim 1, whereas the access code is provided by transmitting the access code to a premise access device over a radio frequency signal.

4. The system of claim 3, wherein the premise access device is an electronic keyless entry lock.

5. The system of claim 3, wherein the premise access device is an electronic lockbox.

6. The system of claim 1, whereas the access code is provided by transmitting the access code to a premise access device over an infra-red signal.

7. The system of claim 1, whereas upon arriving at the one of the premises and upon leaving the one of the premises, a record is kept indicating a time of arriving, a time of departing, and an identification of the one of the premises.

8. The system of claim 1, wherein the location of the device is determined by reading a global positioning service of the device.

9. A method of providing access to a premise by a prospective buyer, the method comprising:
obtaining a pre-approved loan by the buyer, the pre-approved loan having a pre-approved loan amount;
providing a set of listings of premises available;
generating a subset of listings in which the pre-approved loan amount supports an offer for each of the listings in the subset of the listings of premises available;
an application running on a portable device determining when the portable device is near one of the premises in the subset of the listings;

upon arrival near the one of the premises in the subset of listings, the application running on a portable device providing an entry function on the portable device; and upon selection of the an entry function by the prospective buyer, the application running on a portable device providing an entry key;

whereas in the step of generating a subset of listings, the pre-approved loan amount supports the offer for each of the listings in the subset of the listings of premises available if an asking price for each of the listings is less than 110% of the pre-approved loan amount.

10. The method of claim 9, whereas the application running on a portable device providing an entry key includes displaying the entry key as a combination.

11. The method of claim 9, whereas the application running on a portable device providing an entry key includes transmitting the entry key to an electronic device associated with the one of the premises.

12. The method of claim 11, wherein the transmitting is performed over radio frequency.

13. The method of claim 11, wherein the electronic device associated with the one of the premises is a keyless entry system.

14. The method of claim 11, wherein the electronic device associated with the one of the premises is an electronic lockbox.

15. Program instructions tangibly embodied in a non-transitory storage medium for providing access to a premise by a prospective buyer who has obtained a pre-approved loan, wherein the at least one instruction comprises:

computer readable instructions running on a portable device for retrieving from a server a set of listings of premises and the computer readable instructions generates a subset of currently available premise listings in which an asking price for each of the listings in the subset is less than 110% of a pre-approved loan amount;

computer readable instruction running on the portable device determining when the portable device is within range of one of the premises by comparing a location of the portable device with a location of each of the premises that are approved for access;

upon determining that the portable device is within range of the one of the premises, computer readable instructions running on the portable device providing an access function on a display of the portable device; and responsive to invoking the access function by the prospective buyer, computer readable instructions running on the portable device initiate access of the one of the premises.

16. The program instructions tangibly embodied in a non-transitory storage medium of claim 15, wherein the computer readable instructions running on the portable device initiate access of the one of the premises by transmitting a radio frequency signal to an electronic access device associated with the one of the premises.

17. The program instructions tangibly embodied in a non-transitory storage medium of claim 15, wherein the computer readable instructions running on the portable device initiate access of the one of the premises by displaying a combination code on a display of the portable device, the combination used to open a combination lock associated with the one of the premises.

* * * * *